United States Patent
Kilaru et al.

(10) Patent No.: US 11,836,187 B2
(45) Date of Patent: Dec. 5, 2023

(54) GENERATING OCCURRENCE CONTEXTS FOR OBJECTS IN DIGITAL CONTENT COLLECTIONS

(71) Applicant: Adobe Inc., San Jose, CA (US)

(72) Inventors: Manoj Kilaru, Hyderabad (IN); Vishwa Vinay, Bangalore (IN); Vidit Jain, Delhi (IN); Shaurya Goel, Hisar (IN); Ryan A. Rossi, Santa Clara, CA (US); Pratyush Garg, New Delhi (IN); Nedim Lipka, Campbell, CA (US); Harkanwar Singh, Patiala (IN)

(73) Assignee: Adobe Inc., San Jose, CA (US)

( * ) Notice: Subject to any disclaimer, the term of this patent is extended or adjusted under 35 U.S.C. 154(b) by 660 days.

(21) Appl. No.: 17/079,945

(22) Filed: Oct. 26, 2020

(65) Prior Publication Data
US 2022/0129498 A1 Apr. 28, 2022

(51) Int. Cl.
| | |
|---|---|
| *G06F 16/55* | (2019.01) |
| *G06N 20/00* | (2019.01) |
| *G06F 16/583* | (2019.01) |
| *G06F 16/54* | (2019.01) |
| *G06F 40/47* | (2020.01) |
| *G06F 40/30* | (2020.01) |
| *G06F 18/214* | (2023.01) |

(52) U.S. Cl.
CPC .......... *G06F 16/5854* (2019.01); *G06F 16/54* (2019.01); *G06F 16/55* (2019.01); *G06F 18/214* (2023.01); *G06F 40/30* (2020.01); *G06F 40/47* (2020.01); *G06N 20/00* (2019.01)

(58) Field of Classification Search
None
See application file for complete search history.

(56) References Cited

U.S. PATENT DOCUMENTS 11,373,390 B2 * 6/2022 Zhao ................... G06F 18/2413

OTHER PUBLICATIONS

Quan Wang et al., "Knowledge Graph Embedding: A Survey of Approaches and Applications", Dec. 2017, IEEE Transactions on Knowledge and Data Engineering, vol. 29, No. 12, pp. 1-20 (Year: 2017).*

(Continued)

*Primary Examiner* — Dov Popovici
(74) *Attorney, Agent, or Firm* — FIG. 1 Patents

(57) ABSTRACT

In implementations of systems for generating occurrence contexts for objects in digital content collections, a computing device implements a context system to receive context request data describing an object that is depicted with additional objects in digital images of a digital content collection. The context system generates relationship embeddings for the object and each of the additional objects using a representation learning model trained to predict relationships for objects. A relationship graph is formed for the object that includes a vertex for each relationship between the object and the additional objects indicated by the relationship embeddings. The context system clusters the vertices of the relationship graph into contextual clusters that each represent an occurrence context of the object in the digital images of the digital content collection. The context system generates, for each contextual cluster, an indication of a respective occurrence context for the object for display in a user interface.

20 Claims, 13 Drawing Sheets

(56) References Cited

OTHER PUBLICATIONS

"Sklearn.cluster.OPTICS", Scikit-Learn version 0.23.2 [retrieved Nov. 20, 2020]. Retrieved from the Internet <https://scikit-learn.org/stable/modules/generated/sklearn.cluster.OPTICS.html>., 4 pages.

"VisualGenome", VisualGenome [retrieved Nov. 20, 2020]. Retrieved from the Internet <https://visualgenome.org/>., 1 page.

Bordes, Antoine et al., "Translating Embeddings for Modeling Multi-relational Data", Advances in Neural Information Processing Systems 26 [retrieved Sep. 9, 2020]. Retrieved from the Internet <https://proceedings.neurips.cc/paper/2013/file/1cecc7a77928ca8133fa24680a88d2f9-Paper.pdf>., Dec. 2013, 9 pages.

Epasto, Alessandro et al., "Is a Single Embedding Enough? Learning Node Representations that Capture Multiple Social Contexts", In the World Wide Web Conference (WWW '19). Association for Computing Machinery, New York, NY, USA [retrieved Nov. 20, 2020]. Retrieved from the Internet <https://arxiv.org/pdf/1905.02138.pdf>., May 6, 2019, 11 pages.

Gao, Ming et al., "BiNE: Bipartite Network Embedding", In the 41st International ACM SIGIR Conference on Research & Development in Information Retrieval [retrieved Nov. 20, 2020]. Retrieved from the Internet <https://www.nextcenter.org/wp-content/uploads/2020/04/BiNE-Bipartite-Network-Embedding.pdf>., Jun. 2018, 10 pages.

Hamilton, William L. et al., "Representation Learning on Graphs: Methods and Applications", arXiv Preprint [retrieved Nov. 20, 2020]. Retrieved from the Internet <https://arxiv.org/pdf/1709.05584.pdf>., Sep. 17, 2017, 24 pages.

Han, Xu et al., "OpenKE", GitHub.com, thunIp/OpenKE [retrieved Nov. 20, 2020]. Retrieved from the Internet <https://github.com/thunIp/OpenKE>., 6 pages.

Hocevar, Tomaz, "ORbit Counting Algorithm", Github.com [retrieved Nov. 20, 2020]. Retrieved from the Internet <https://github.com/thocevar/orca>., May 30, 2016, 2 pages.

Ji, Shaoxiong et al., "A Survey on Knowledge Graphs: Representation, Acquisition and Applications", arXiv Preprint [retrieved Nov. 20, 2020]. Retrieved from the Internet <https://arxiv.org/pdf/2002.00388.pdf>., Feb. 2, 2020, 26 pages.

Johnson, Justin et al., "Image Retrieval using Scene Graphs", Computer Vision Foundation, in Proceedings of the IEEE Conference on Computer Vision and Pattern Recognition (CVPR), 2015 [retrieved Nov. 20, 2020]., Retrieved from the Internet <https://openaccess.thecvf.com/content_cvpr_2015/html/Johnson_Image_Retrieval_Using_2015_CVPR_paper.html>., Jun. 1, 2015, pp. 3668-3678.

Rossi, Andrea et al., "Knowledge Graph Embedding for Link Prediction: A Comparative Analysis", arXiv Preprint [retrieved Nov. 20, 2020]. Retrieved from the Internet <, Feb. 20, 2020, 43 pages.

Rossi, Ryan A. et al., "From Community to Role-based Graph Embeddings", arXiv Preprint [retrieved Nov. 20, 2020]. Retrieved from the Internet <https://arxiv.org/pdf/1908.08572v1.pdf>., Aug. 22, 2019, 31 pages.

Wang, Quan et al., "Knowledge Graph Embedding: A Survey of Approaches and Applications", In IEEE Transactions on Knowledge and Data Engineering, vol. 29, No. 12 [retrieved Nov. 20, 2020]. Retrieved from the Internet <https://persagen.com/files/misc/Wang2017Knowledge.pdf>., Sep. 20, 2017, 20 pages.

* cited by examiner

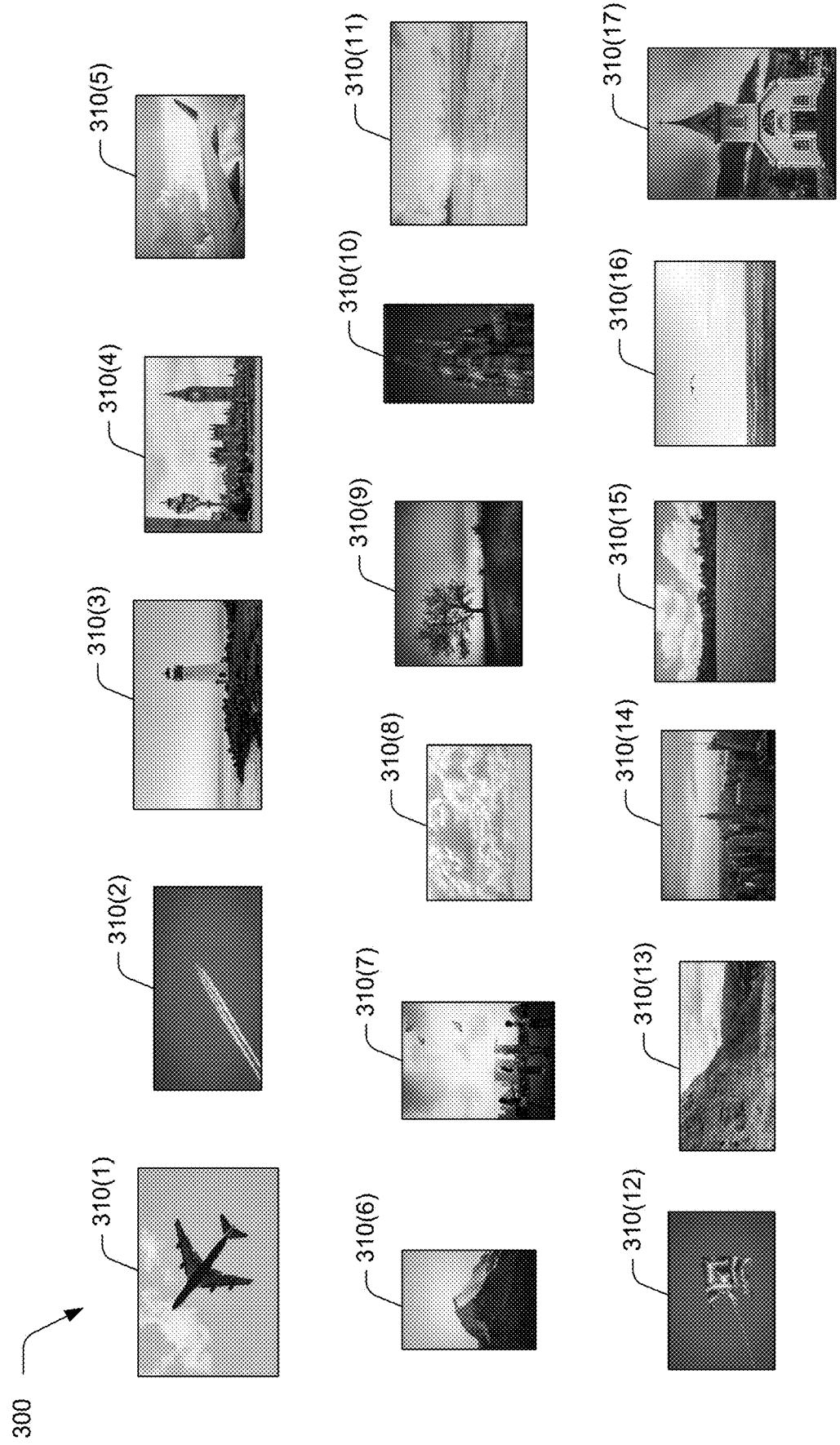

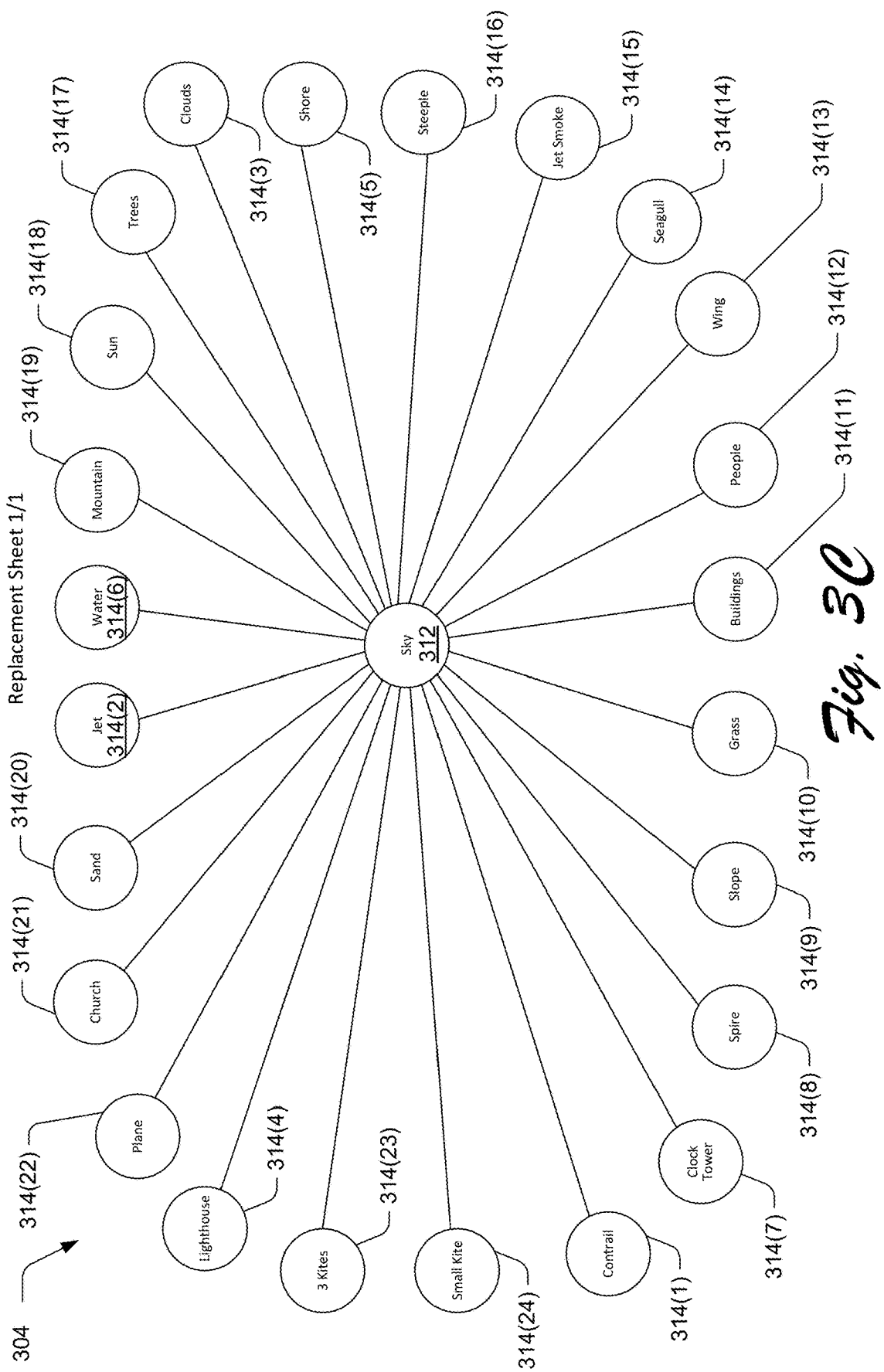

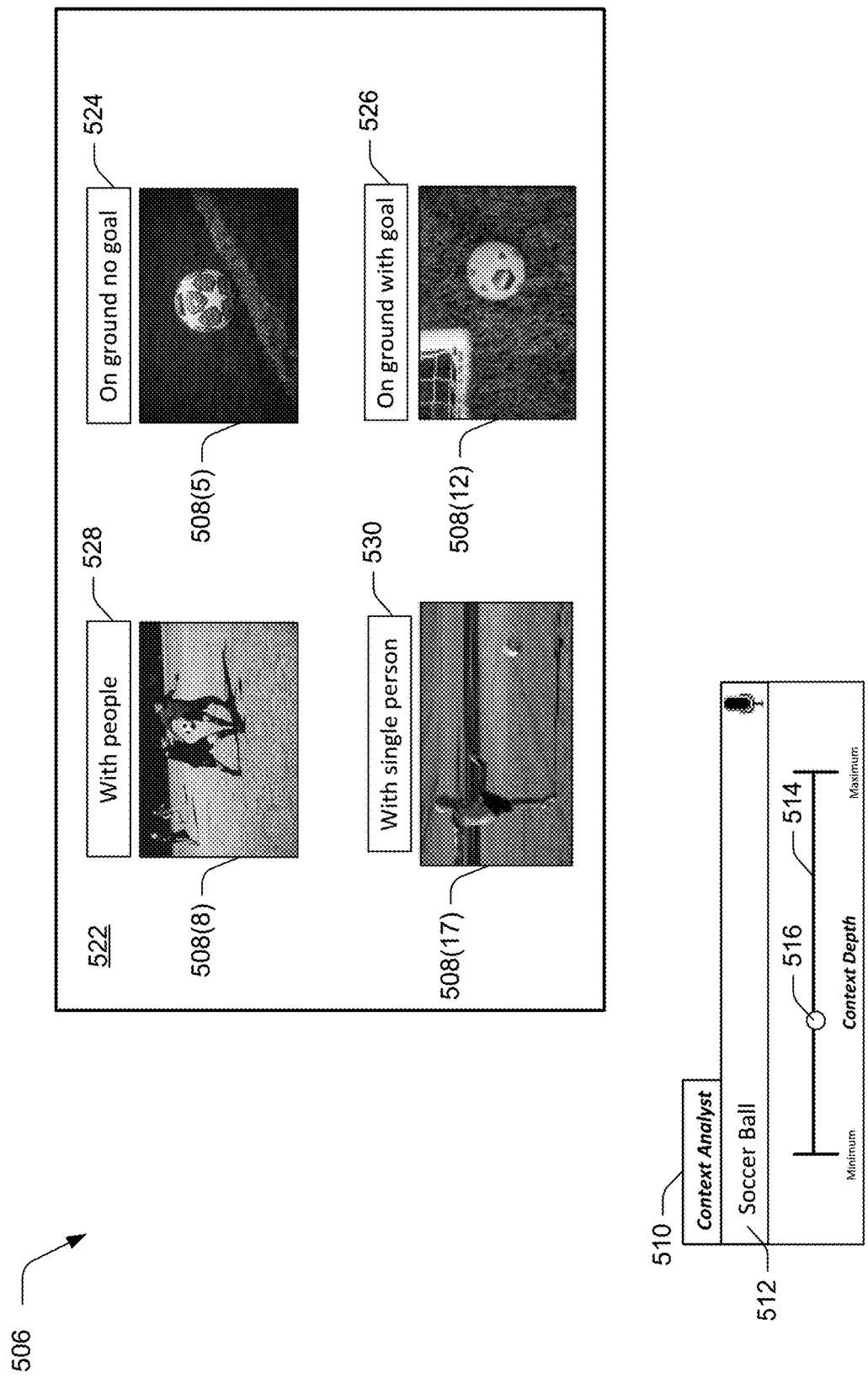

GENERATING OCCURRENCE CONTEXTS FOR OBJECTS IN DIGITAL CONTENT COLLECTIONS

BACKGROUND

Digital content collections often include millions and in some cases even billions of digital images. Conventional techniques for navigating, exploring, and/or browsing these large digital content collections are limited to image searches and image recommendations. In conventional searching techniques, a keyword search query is input to a search system which returns digital images related to the keywords of the query. For example, the search system receives a keyword search input that describes an object and the search system returns digital images included in the collection that depict the object.

In conventional recommendation techniques, a recommendation system identifies relevant digital images included in the collection based on a relevancy metric and suggests the identified images as being relevant to a user. Common relevancy metrics include recommending digital images based on popularity and recommending digital images based on user data such as a user profile, prior user interactions, and so forth. For example, the recommendation system determines that a particular object is relevant to the user and the recommendation system suggests digital images of the collection that depict the particular object to the user. However, conventional search and recommendation systems are not capable of indicating how objects depicted in digital images of a digital content collection are related to other objects depicted in the digital images.

SUMMARY

Techniques and systems are described for generating occurrence contexts for objects in digital content collections. In an example, a computing device implements a context system to receive context request data describing an object that is depicted with additional objects in digital images of a digital content collection. For example, the context system generates relationship embeddings for the object and each of the additional objects using a representation learning model trained to predict relationships for objects.

A relationship graph is formed for the object that includes a vertex for each relationship between the object and the additional objects indicated by the relationship embeddings. In one example, the context system clusters vertices of the relationship graph into contextual clusters that each represent an occurrence context of the object in the digital images of the digital content collection. These occurrence contexts are sets of similar relationships between the object and the additional objects depicted in the digital images. The context system generates an indication of a respective occurrence context for each contextual cluster for display in a user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 3A, 3B, 3C, 3D, and 3E illustrate an example of generating occurrence contexts for an object included in a digital image collection.

FIGS. 5A, 5B, 5C, and 5D illustrate an example of an object included in a digital content collection and a user interface for displaying occurrence contexts for the object in the digital content collection.

DETAILED DESCRIPTION

Overview

Figure 1:
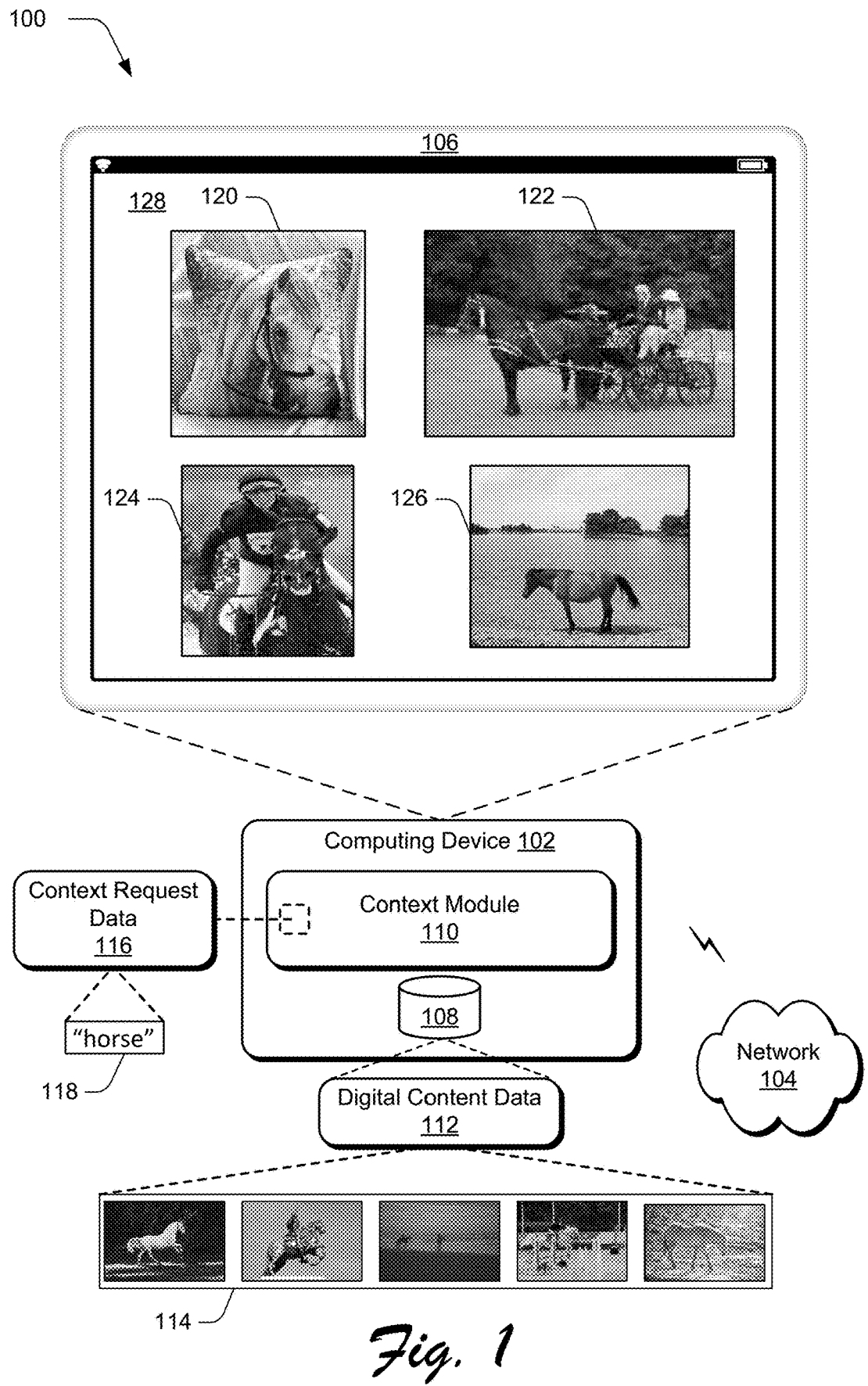
FIG. 1 is an illustration of an environment in an example implementation that is operable to employ digital systems and techniques for generating occurrence contexts for objects included in digital content collections as described herein.

Digital content collections often include millions of digital images which depict thousands of related objects. Conventional systems are not capable of determining how a particular object is related to additional objects that are depicted together in digital images of a digital content collection. Because of this limitation, identification of relationships between objects depicted together in the digital images using conventional techniques requires extensive manual curation of the collection.

To overcome the limitations of conventional systems, techniques and systems are described for generating occurrence contexts for objects in digital content collections. In an example, a computing device implements a context system to receive context request data describing an object that is depicted with additional objects in digital images of a digital content collection. The context system generates a scene graph for each digital image included in the collection. Each scene graph describes relationships between objects depicted together in a corresponding digital image as (subject, relation, object) relationship triplets.

The context system then aggregates the scene graphs into a global graph which includes one node for each object included in the digital content collection. The nodes are connected to other nodes based on relationships between objects represented by the nodes described in the relationship triplets. For example, the context system generates relationship embeddings for the object and each of the additional objects using a representation learning model trained to predict relationships for objects. In an example, the representation learning model is a translation-based representation learning model.

A relationship graph is formed for the object described by the context request data. This relationship graph includes a vertex for each relationship between the object and the additional objects indicated by the relationship embeddings. For example, the relationship graph is an ego-network and the vertices are 1-hop neighbor vertices with self-edges excluded.

In one example, the context system clusters the vertices of the relationship graph into contextual clusters that each represent an occurrence context of the object in the digital images of the digital content collection. These occurrence contexts are sets of similar relationships between the object and the additional objects depicted in the digital images. The context system generates an indication of a respective occurrence context for each contextual cluster for display in a user interface.

The described systems improve conventional techniques which are not capable of determining how a particular object is related to additional objects depicted together in digital images throughout a digital content collection. Occurrence contexts for the particular object generated using the described systems are also usable to infer additional information about the digital content collection. Because each digital image depicting the particular object in the digital content collection is represented by one of the occurrence contexts for the particular object, the digital content collection likely does not include any images depicting the particular object in contexts which are not similar to the indicated occurrence contexts.

In one example, occurrence contexts for objects of a digital content collection are usable to understand development of the digital content collection over time. In this example, occurrence contexts generated for an object of the digital content collection at a first point in time differ from occurrence contexts generated for the object at a second point in time. These differences represent changes to the content included in the digital content collection between the first and second points in time which is facilitated without any manual curation of the collection.

Additionally, the described systems are not limited to generating occurrence contexts for a single object of a digital content collection. Rather, the described systems are capable of generating occurrence contexts for multiple objects of the digital content collection. In one example, the context system generates occurrence contexts for every object included in the digital content collection. In this manner, the context system provides additional functionality to improve conventional techniques for navigating, exploring, and/or browsing digital content included in the digital content collection.

Consider an example in which conventional techniques for browsing digital images of a digital content collection such as techniques that leverage digital image metadata are both augmented and enhanced by the described systems. In one example, occurrence contexts are generated for every unique object depicted in the digital images of the digital content collection. In this example, temporal capture data included in the metadata of the digital images augments the occurrence contexts by facilitating temporal browsing such as browsing sets of related objects depicted together in digital images captured before, during, and after a global pandemic. In a similar example, geographic capture data included in the metadata of the digital images enhances the occurrence contexts by facilitating geographic browsing which exposes sets of related objects depicted together in digital images captured in different countries and captured in different regions within a single country.

Term Examples

As used herein, the term "relationship" between an object and an additional object refers to an instance in which the object and the additional object are depicted together in a digital image that is describable using a (subject, relation, object) triplet. By way of example, a bird object and a sky object depicted together in a digital image have a relationship describable as (bird, is flying in, sky). By way of additional example, a jet object and the sky object depicted together in a digital image have a relationship describable as (jet, is flying in, sky).

As used herein, the term "occurrence context" for an object refers to a set of similar relationships between the object and additional objects depicted in digital images of a digital image collection. By way of example, if the digital image collection includes a digital image depicting a bird flying in a sky and a digital image depicting a jet flying in a sky, then an occurrence context for a sky object in the digital image collection is as a background object for flying objects. By way of additional example, if the digital image collection of the previous example also includes a digital image depicting a sky above a mountain and a digital image depicting a sky above a lake, then an additional occurrence context for the sky object in the digital image collection is as an object above natural objects.

As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

As used herein, the term "representation learning model" refers to a type of machine learning model that utilizes algorithms to learn from, and make predictions on, known representations of data by analyzing the known representations of data to learn to generate outputs that reflect patterns and attributes of the known representations of data. By way of example, a representation learning model makes high-level abstractions in representations of data by generating data-driven predictions or decisions from known representations of input data.

In the following discussion, an example environment is first described that employs examples of techniques described herein. Example procedures are also described which are performable in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and context module 110. The storage device 108 maintains digital content data 112 that describes digital content collections such as a digital image collection 114. As shown, the digital image collection 114 includes multiple digital images that depict objects with additional objects.

The context module 110 is illustrated as having, receiving, and/or transmitting context request data 116. For example, the context request data 116 is a user input describing an object included in the digital images of the digital image collection 114. In this example, a user interacts with an input device (e.g., a keyboard, a stylus, a microphone, and so forth) to indicate an object and the context module 110 receives the context request data 116 from the input device (e.g., via the network 104) that describes the object indicated by the user. In the illustrated example, the context request data 116 describes a horse 118 which is shown as a textual input requesting occurrence contexts for the horse 118 in the digital image collection 114.

The context module 110 receives the context request data 116 and processes the digital content data 112 to generate a scene graph representation of each digital image included in the digital image collection 114. To do so, the context module 110 extracts relationships between objects depicted together in the digital images as (subject, relation, object) relationship triplets. For example, a scene graph for a particular digital image includes relationship triplets for each object depicted in the particular digital image that has a relationship with another object depicted in the particular digital image.

The context module 110 aggregates the scene graph representations of the digital images included in the digital image collection 114 into a global graph. This global graph includes one node for each object included in the digital image collection and the nodes are connected based on the relationship triplets. For example, a first node of the global graph corresponding to a first object is connected to a second node of the global graph corresponding to a second object if a scene graph includes a triplet that describes a relationship between the first object and the second object.

The context module 110 generates relationship embeddings for the objects included in the digital image collection 114 using a representation learning model trained to predict relationships for objects. For example, the context module 110 generates the relationship embeddings using a translation-based representation learning model trained to predict the relationships using training data that describes a portion of the digital image collection 114. In this example, the context module 110 uses the relationship embeddings and the global graph to form a relationship graph. In one example, the relationship graph is an ego-network constructed from the global graph such that each node of the global graph is included in the relationship graph along with each node's 1-hop neighbor nodes but self-edges are not included in the relationship graph.

The context module 110 identifies a node of the relationship graph which corresponds to the horse 118 and then identifies a vertex of the relationship graph for each relationship between the horse 118 and additional objects included in the digital image collection 114. For example, the context module 110 clusters vertices of the relationship graph that correspond to objects having a relationship with the horse 118 in the digital image collection 114 into contextual clusters. Each of these contextual clusters represents an occurrence context of the horse 118 in the digital images of the digital image collection 114. The context module 110 then generates indications 120-126 which each correspond to a contextual cluster for the horse 118.

These indications 120-126 are rendered in a user interface 128 of the display device 106. As shown, there are four occurrence contexts for the horse 118 in the digital image collection 114. Indication 120 depicts an example of a first occurrence context for the horse 118 in which a rendition of a horse appears on another object. In this example, the rendition of the horse appears on a pillow.

Indication 122 depicts an example of a second occurrence context for the horse 118 in which a horse is attached to another object for transportation. As shown, the indication 122 depicts a horse attached to a cart for transportation. Indication 124 depicts an example of a third occurrence context for the horse 118 in the digital image collection 114 in which a person is riding a horse. Indication 126 depicts an example of a fourth occurrence context for the horse 118 in which a horse appears in a natural environment. In this example, the horse is standing in front of a body of water.

Consider an example in which the indications 120-126 are usable to summarize how the horse 118 is depicted in the digital images of the digital image collection 114. For example, each digital image that is included in the digital image collection 114 and depicts a horse is included in a contextual cluster corresponding to one of the indications 120-126. In this example, it is inferable that the digital image collection 114 likely includes digital images depicting horses in various outdoor scenes, people riding horses, horses pulling carts and other vehicles, and renditions of horses on clothing, on household items for decoration, etc. It is also inferable from the indications 120-126 that the digital image collection 114 likely does not include images depicting, for example, a horse with wings, a unicorn, a horse wearing a funny hat, and so forth. This is because these examples are not contextually similar to the occurrence contexts for the horse 118 depicted by the indications 120-126.

Figure 2:
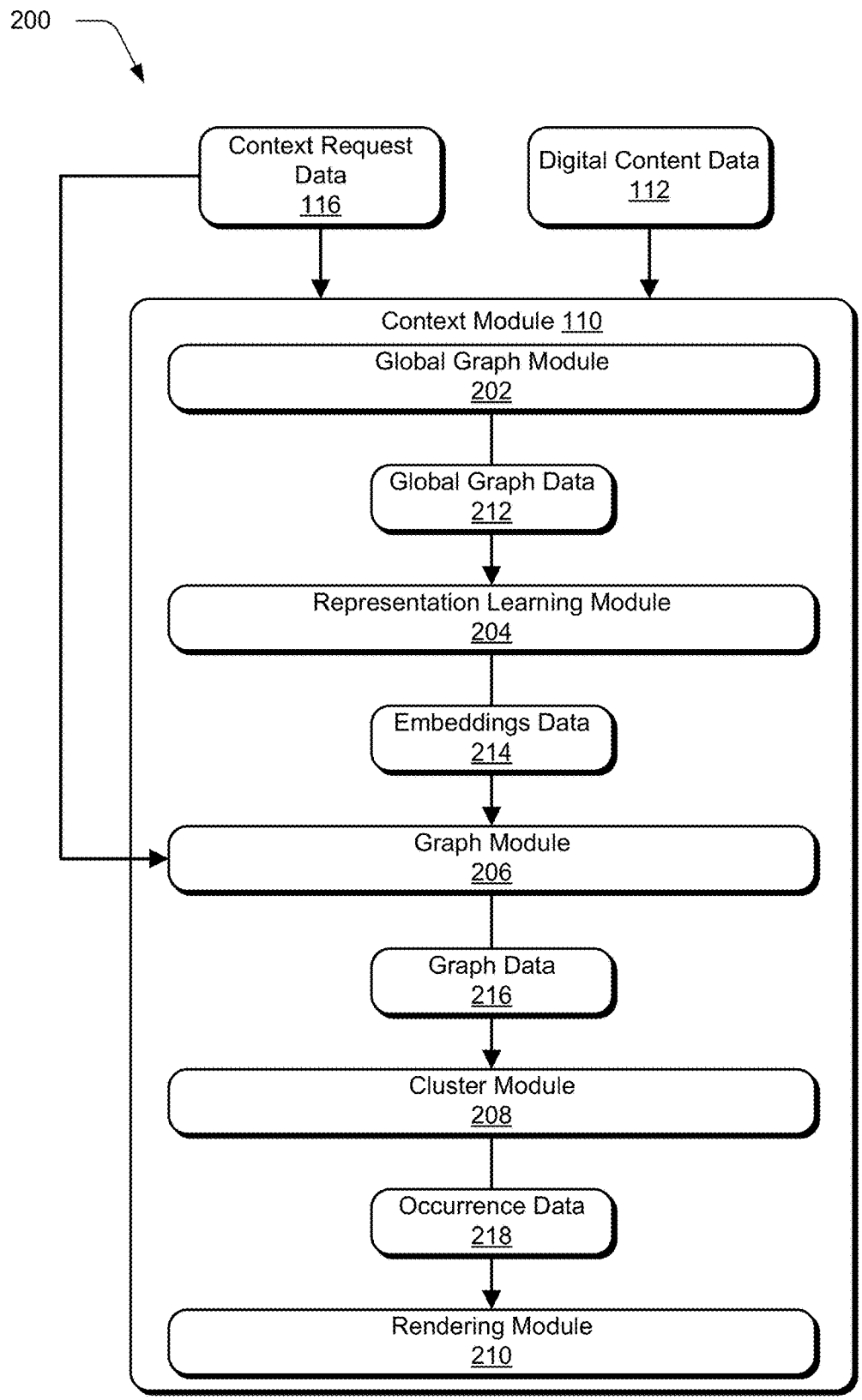
FIG. 2 depicts a system in an example implementation showing operation of a context module for generating occurrence contexts for objects included in digital content collections.

FIG. 2 depicts a system 200 in an example implementation showing operation of a context module 110. The context module 110 is illustrated to include a global graph module 202, a representation learning module 204, a graph module 206, a cluster module 208, and a rendering module 210. The context module 110 receives the digital content data 112 and the context request data 116 as inputs. For example, the global graph module 202 receives the digital content data 112 that describes digital content collections and the global graph module 202 processes the digital content data 112 to generate global graph data 212.

Figure 3B:
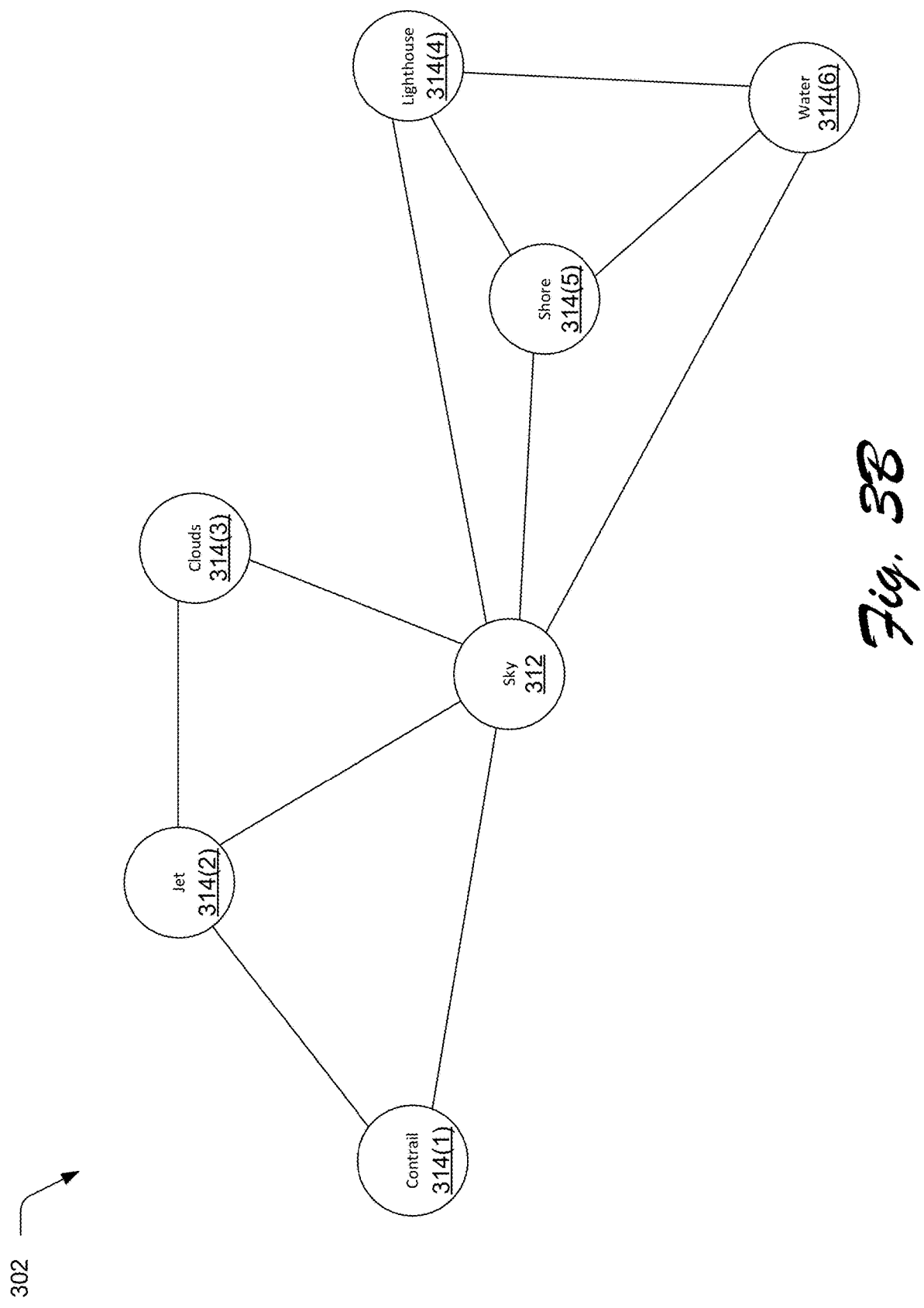
Figure 3D:
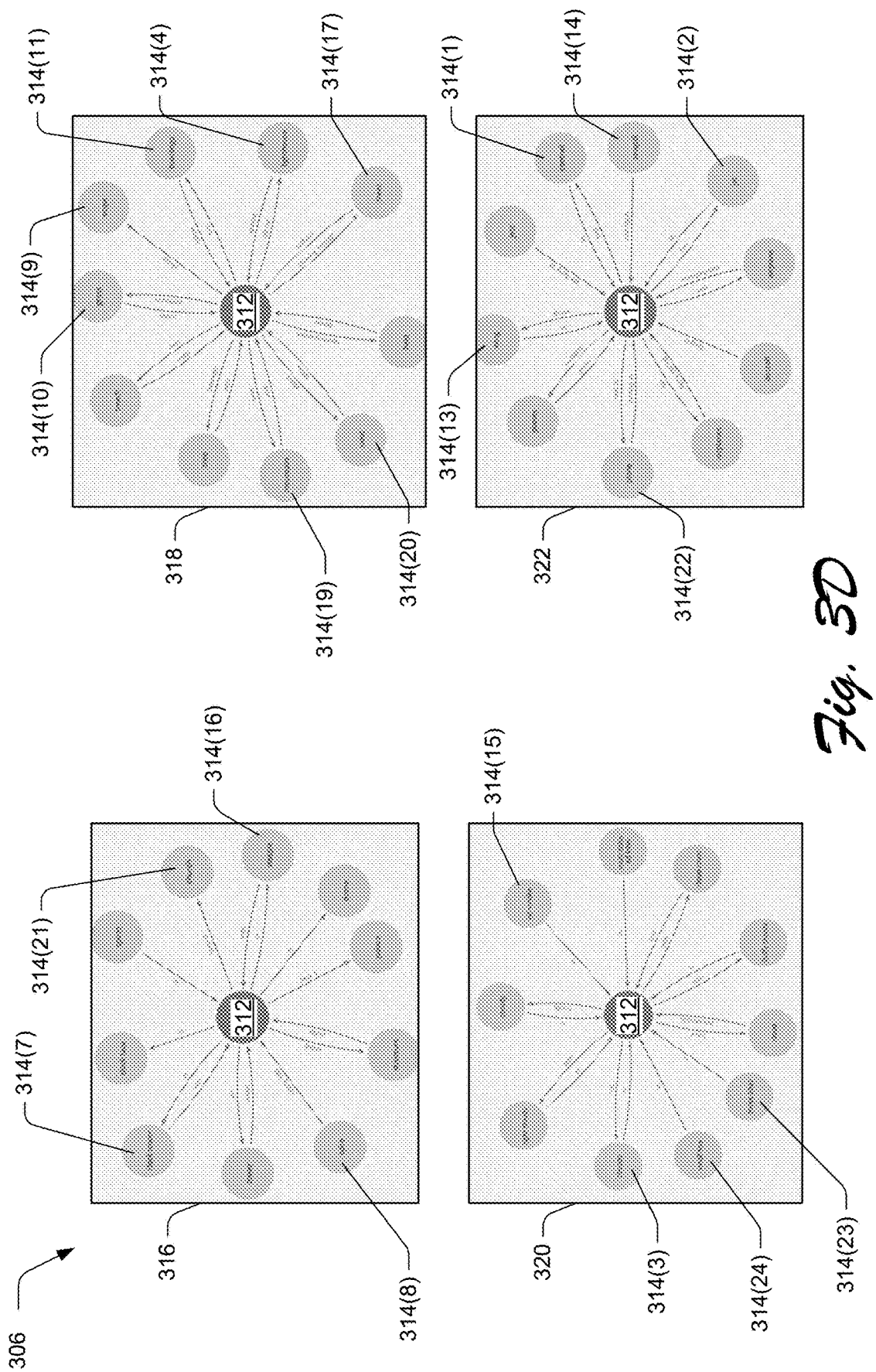
Figure 3E:
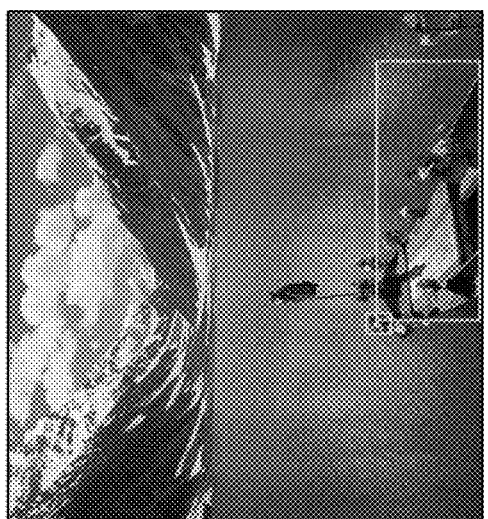
Figure 3E:
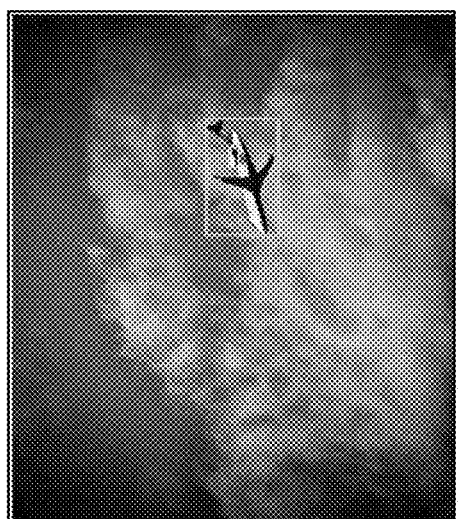
Figure 3E:
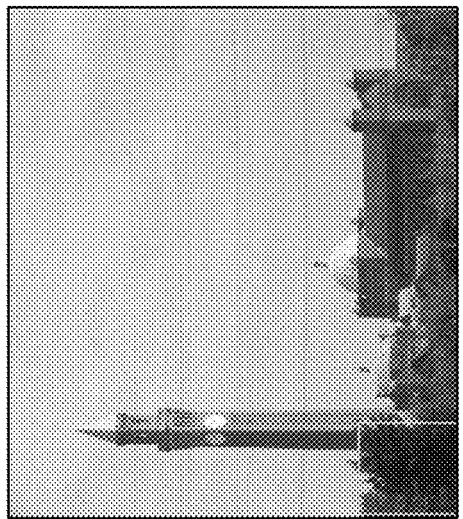
Figure 3E:
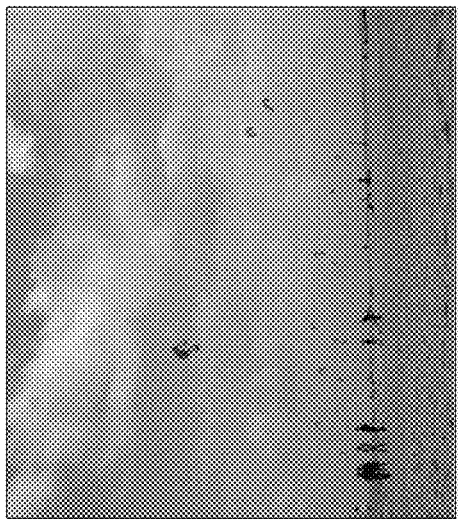

FIGS. 3A, 3B, 3C, 3D, and 3E illustrate an example of generating occurrence contexts for an object included in a digital image collection. FIG. 3A illustrates a portion of a digital image collection 300. FIG. 3B illustrates a portion of a global graph 302 for the digital image collection 300. FIG. 3C illustrates a portion of a node 304 of a relationship graph. FIG. 3D illustrates a representation 306 of contextual clusters of a modified relationship graph. FIG. 3E illustrates a representation 308 of indications of occurrence contexts for an object included in the portion of the digital image collection 300.

As shown in FIG. 3A, the digital content data 112 describes the portion of the digital image collection 300 that includes digital images 310(1)-310(17) which depict objects with additional objects. Digital image 310(1) depicts a sky, clouds, and a plane; digital image 310(2) depicts a sky, a jet, a contrail, and jet smoke; and digital image 310(3) depicts a sky, a lighthouse, a shore, and water. A sky object is depicted in each of the digital images 310(1)-310(17) while a cloud object is depicted in digital images 310(1), 310(4), 310(5), 310(7)-310(9), 310(11), and 310(13)-310(17). A plane or jet object is depicted in digital images 310(1), 310(2), and 310(5) and a water object is depicted in digital images 310(3), 310(11), and 310(16). A mountain object and a slope object are each depicted in digital images 310(6), 310(13), and 310(17).

As illustrated, a spire object is depicted in digital images 310(4), 310(10), 310(14), and 310(17) and a steeple object is depicted with a church object in digital images 310(10) and 310(17). Digital image 310(12) depicts a small kite while digital image 310(7) depicts three kites. Grass is depicted in digital images 310(7), 310(9), 310(13), and 310(15). As shown, buildings are depicted in digital images 310(4), 310(7), 310(10), and 310(14). Digital images 310(1) and 310(5) depict a wing object, digital image 310(4) depicts a clock tower object, and digital image 310(11) depicts sand and a sun object. Digital image 310(5) also depicts a sun and trees are depicted in digital images 310(9) and 310(15). Finally, people are depicted in digital images 310(4) and 310(7).

The global graph module 202 processes the digital content data 112 and generates a scene graph representation for each of the digital images 310(1)-310(17). These scene graphs describe relationships of objects depicted together in the digital images 310(1)-310(17) using (subject, relation, object) relationship triplets. By way of example, a scene graph for the digital image 310(1) includes the following relationship triplets (clouds, are in, sky); (plane, is in, sky), and (clouds, are above, plane).

The global graph module 202 aggregates the scene graph representations of the objects depicted in the digital images 310(1)-310(17) into a global graph that includes one node for each object depicted in the digital images 310(1)-310(17) and these nodes are connected based on the relationship triplets. The global graph module 202 generates the global graph data 212 as describing the global graph. FIG. 3B illustrates a portion of the global graph 302. In one example, the global graph is a heterogeneous graph; however, in another example, the global graph is a homogeneous graph. The portion of the global graph 302 is illustrated to include object relationships depicted in digital images 310(1)-310(3).

As shown in FIG. 3B, the portion of the global graph 302 includes a sky node 312 as well as a contrail node 314(1), a jet node 314(2), a clouds node 314(3), a lighthouse node 314(4), a shore node 314(5), and a water node 314(6). The contrail node 314(1) is connected to the sky node 312 based on a (contrail, is in, sky) relationship triplet included in a scene graph for the digital image 310(2). The jet node 314(2) is also connected to the sky node 312 based on a (jet, is in, sky) relationship triplet included in a scene graph for the digital image 310(1) and the scene graph for the digital image 310(2). In some examples, the connection between the jet node 314(2) and the sky node 312 has a weight of two because the (jet, is in, sky) relationship triplet included in two scene graphs. In other examples, the connection between the jet node 314(2) and the sky node 312 is not weighted even though the (jet, is in, sky) relationship triplet occurs in multiple scene graphs.

The contrail node 314(1) is also connected to the jet node 314(2) based on a (contrail, is behind, jet) relationship triplet included in the scene graph for the digital image 310(2). The clouds node 314(3) is connected to the sky node 312 based on a (clouds, are in, sky) relationship triplet in the scene graph for the digital image 310(1) and the clouds node 314(3) is also connected to the jet node 314(2) based on a (jet, is under, clouds) relationship triplet which is also included in the scene graph for the digital image 310(1). As shown, the lighthouse node 314(4) is connected to the sky node 312, the shore node 314(5), and the water node 314(5) based on relationship triplets (lighthouse, is under, sky), (lighthouse, is on, shore), and (lighthouse, overlooks, water), respectively, which are included in a scene graph for the digital image 310(3).

The shore node 314(5) is also connected to the sky node 312 and the water node 314(6) based on a (shore, is under, sky) relationship triplet and a (water, is along, shore) relationship triplet, respectively, that are included in the scene graph for the digital image 310(3). In addition to being connected to the lighthouse node 314(4) and the shore node 314(5), the water node 314(6) is also connected to the sky node 312 based on a (water, is under, sky) relationship triplet included in the scene graph for the digital image 310(3). The representation learning module 204 receives the global graph data 212 and processes the global graph data 212 to generate embeddings data 214.

The representation learning module 204 includes a representation learning model trained to predict relationships for objects. In one example, the representation learning module 204 includes a translation-based representation learning model that generates relationship embeddings for the objects included in the global graph described by the global graph data 212. The relationships of the objects depicted in the digital images 310(1)-310(17) are represented as translations in the relationship embeddings. The representation learning module 204 generates the relationship embeddings as one embedding per object and one representation per relationship. The representation learning module 204 generates the embeddings data 214 as describing the relationship embeddings.

In one example, the graph module 206 receives the context request data 116 and the embeddings data 214 which includes the global graph data 212 and the graph module 206 processes the context request data 116, the embeddings data 214, and/or the global graph data 212 to generate graph data 216. In this example, the context request data 116 describes a sky object and the graph module 206 forms a relationship graph for the sky object that includes a vertex for each relationship between the sky object and the additional objects included in portion of the digital image collection 300. FIG. 3C illustrates the partial node 304 of the relationship graph for the sky object. In an example, the relationship graph is a heterogeneous graph; however, in other examples the relationship graph is a homogeneous graph. Although illustrated as including the partial node 304, it is to be appreciated that the relationship graph includes a node for each object that is included in the portion of the digital image collection 300. For example, each node of the relationship graph is connected to other nodes based on relationships between objects depicted in together in the digital images 310(1)-310(17).

As shown, the partial node 304 includes the sky node 312 which is connected to the contrail node 314(1), the jet node 314(2), the clouds node 314(3), the lighthouse node 314(4), the shore node 314(5), and the water node 314(6). The sky node 312 is also connected to a clock tower node 314(7), a spire node 314(8), a slope node 314(9), a grass node 314(10), a buildings node 314(11), a people node 314(12), a wing node 314(13), a seagull node 314(14), a jet smoke node 314(15), a steeple node 314(6), a trees node 314(17), a sun node 314(18), a mountain node 314(19), a sand node 314(20), a plane node 314(22), a 3 kites node 314(23), and a small kite node 314(24). As shown in FIG. 3C, the relationship graph for the sky object is an ego-network constructed from the global graph data 212 and the embeddings data 214 that includes each of the sky node's 312 1-hop neighbor nodes and excludes self-edges. For example, the graph module 206 generates the graph data 216 as describing the relationship graph for the sky object.

The cluster module 208 receives the graph data 216 and processes the graph data 216 to generate occurrence data 218. To do so, the cluster module 208 clusters vertices of the relationship graph for the sky object into contextual clusters. Each of these contextual clusters represents an occurrence context of the sky object in the portion of the digital image collection 300. The cluster module 208 is capable of clustering the vertices of the relationship graph for the sky object into the contextual clusters using a variety of clustering methods.

In one example, the cluster module 208 clusters the vertices based on a structure of the relationship graph for the sky object. In some examples, this includes Modularity, Label Propagation, and so forth. For example, the cluster module 208 clusters the vertices based on an unweighted structure of the relationship graph for the sky object in which each relationship between the sky object and additional objects is assigned an equal weight. In another example, the cluster module 208 clusters the vertices based on a weighted structure of the relationship graph for the sky object in which each relationship between the sky object and the additional objects is assigned a weight corresponding to a number of occurrences of each relationship in the portion of the digital image collection 300.

In some examples, the cluster module 208 generates external data describing the objects included in the relationship graph and the cluster module 208 leverages this external data to cluster the vertices of the relationship graph for the sky object into the contextual clusters. In one example, the cluster module 208 uses semantic data to cluster the vertices of the relationship graph for the sky object into the contextual clusters. In this example, the cluster module 208 includes Word2vec embeddings for each object included in the relationship graph for the sky object and clusters the vertices using the embeddings. In another example, the cluster module 208 generates semantic embeddings for each object included in the relationship graph using a machine learning model trained to predict word associations using training data describing a corpus of text. For example, the cluster module 208 uses an ordering points to identify clustering structure (OPTICS) algorithm to cluster the vertices and cosine similarity between the embeddings for the similarity metric.

Consider examples in which the cluster module 208 generates external data describing the objects included in the relationship graph such as color data describing colors of the objects as depicted in the digital images included in the portion of the digital image collection 300. For example, the cluster module 208 generates external data describing features of the objects such as whether the objects are photo-realistic or graphic objects. In one example, the cluster module 208 generates external data describing whether the objects are vector-based objects or raster objects. In some examples, the cluster module 208 generates external data describing induced subgraphs of the relationship graph.

In another example, the cluster module 208 uses an Orbit Counting Algorithm (ORCA) to cluster the vertices of the relationship graph for the sky object into the contextual clusters. In this example, the cluster module 208 represents nodes of the relationship graph as graphlets or induced subgraphs of the relationship graph. For example, the cluster module 208 uses a 73-dimensional ORCA embedding as graphlet representations of the nodes.

In one example, the cluster module 208 uses bipartite network embedding to arrange the vertices of the relationship graph for the sky object into the contextual clusters. In this example, the cluster module 208 converts the global graph described by the global graph data 212 into an undirected bipartite graph which the cluster module 208 uses to learn connections between nodes based on an objective function. For example, this results in connected nodes having similar embeddings.

In an additional example, the cluster module 208 leverages a weighted combination of graphlets and semantics to cluster the vertices of the relationship graph for the sky object into the contextual clusters. In this additional example, the cluster module 208 uses the 73-dimensional ORCA embedding as the graphlet representations of the nodes and the Word2vec embeddings as the semantic representations of the nodes. For example, the cluster module 208 uses a weighted combination of the semantic and graphlet embeddings to consider the similarity between nodes which the cluster module 208 leverages to cluster the vertices of the relationship graph for the sky object into the contextual clusters. In one example, the weighted combination applies a 0.9 weight to the semantic embeddings and a 0.1 weight to the graphlet embeddings.

In other examples, the cluster module 208 leverages techniques to remove some edges from the relationship graph for the sky object. In a weighted-semantic example, the cluster module 208 computes Word2vec similarity of nodes including an edge and combines this information with a frequency of occurrence of a (subject, relation, object) relationship triplet that defines the edge. In an example, the cluster module 208 equally combines the semantic information and the occurrence frequency. The cluster module 208 combines the semantic information and occurrence frequency for each edge included in the relationship graph for the sky object and then ranks the edges based on this weighted combination. The cluster module 208 then removes edges that are ranked below a particular percentile. For example, the cluster module 208 retains only the top X percentile of edges. In one example, the cluster module 208 retains only the top 50 percent of the edges. In a weighted-spanned example, the cluster module 208 removes edges from the relationship graph for the sky object such that the resulting distance between two nodes is at most T times the distance between the two nodes in the original relationship graph. For example, the cluster module 208 removes edges from the relationship graph for the sky object such that resulting distance between the two nodes is at most 9 times the distance between the two nodes in the original relationship graph.

Regardless of the specific clustering method employed, the cluster module 208 clusters the vertices of the relationship graph for the sky object into the contextual clusters to generate a modified graph. The cluster module 208 performs knowledge graph embedding methods on this modified graph to obtain context-specific embeddings for the objects and the relationships. FIG. 3D illustrates a representation 306 of contextual clusters of the modified relationship graph. As shown in FIG. 3D, the representation 306 includes contextual clusters 316-322. Contextual cluster 316 represents a first occurrence context for the sky object and the additional objects included the portion of the digital image collection 300. The contextual cluster 316 includes the clock tower node 314(7), the spire node 314(8), the steeple node 314(16), and the church node 314(21) each connected to the sky node 312.

Contextual cluster 318 represents a second occurrence context for the sky object with the additional objects included in the portion of the digital image collection 300. The contextual cluster 318 includes the lighthouse node 314(4), the slope node 314(9), the grass node 314(10), the trees node 314(17), the mountain node 314(19), and the sand node 314(20) each connected to the sky node 312. Contextual cluster 320 represents a third occurrence context for the sky object and includes the clouds node 314(3), the jet smoke node 314(15), the 3 kites node 314(23), and the small kite node 314(24) each connected to the sky node 312. Contextual cluster 322 represents a fourth occurrence context for the sky object and the additional objects included in the portion of the digital image collection 300. The contextual cluster 322 includes the contrail node 314(1), the jet node 314(2), the wing node 314(13), the seagull node 314(14), and the plane node 314(22) each connected to the sky node 312.

The cluster module 208 generates the occurrence data 218 as describing the occurrence contexts of the sky object in the modified graph. The rendering module 210 receives the occurrence data 218 and processes the occurrence data 218 to render indications of the occurrence contexts for the sky object and the additional objects included in the portion of the digital image collection 300. This is illustrated in the representation 308 depicted in FIG. 3E. The representation 308 includes indications 324-330 which each depict an example of one of the four occurrence contexts for the sky object in the portion of the digital image collection 300.

Indication 324 depicts an example of the first occurrence context for the sky object and corresponds to the contextual cluster 316. As shown, the sky object appears above buildings in the first occurrence context. Indication 326 depicts an example of the second occurrence context for the sky object and corresponds to the contextual cluster 318. In the second occurrence context, the sky object appears in a natural landscape such as over mountains or water. Indication 328 depicts an example of the third occurrence context for the sky object and corresponds to the contextual cluster 320. In the third occurrence context, the sky object appears in a scene including kites and/or clouds. Indication 330 depicts an example of the fourth occurrence context for the sky object and corresponds to the contextual cluster 322. The sky object appears as a background for a flying object like a plane or a jet in the fourth occurrence context.

Consider an example in which the indications 324-330 and corresponding occurrence contexts for the sky object are usable to summarize how the sky object appears in the portion of the digital image collection 300. For example, each of the digital images 310(1)-310(17) that depicts a sky object is included in one of the four occurrence contexts for the sky object. In this example, it is inferable that the portion of the digital image collection 300 likely includes additional digital images depicting a sky object in a natural landscape or as background for a flying object. It is also inferable based on the four occurrence contexts for the sky object that the portion of the digital image collection 300 likely does not include digital images depicting the sky object in inclement weather scenes such as during a lightning storm. This is because the inclement weather example is not contextually similar to any of the four occurrence contexts for the sky object.

Although examples are described with respect to occurrence contexts for an object included in the digital image collection 300, it is to be appreciated that the described systems are capable of generating occurrence contexts for multiple objects included the digital image collection 300. In an example in which the context request data 116 describes multiple objects included in the digital image collection 300, the context module 110 generates occurrence contexts for each of the multiple objects. For example, if the context request data 116 describes every object included in the digital image collection 300, then the context module 110 generates occurrence contexts for every object included in the digital image collection 300. In these examples, the described systems are also usable for curation of digital image collection 300 which is performable automatically and without user intervention. This curation allows for browsing and exploratory navigation of the digital image collection 300 based on the generated occurrence contexts.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 4:
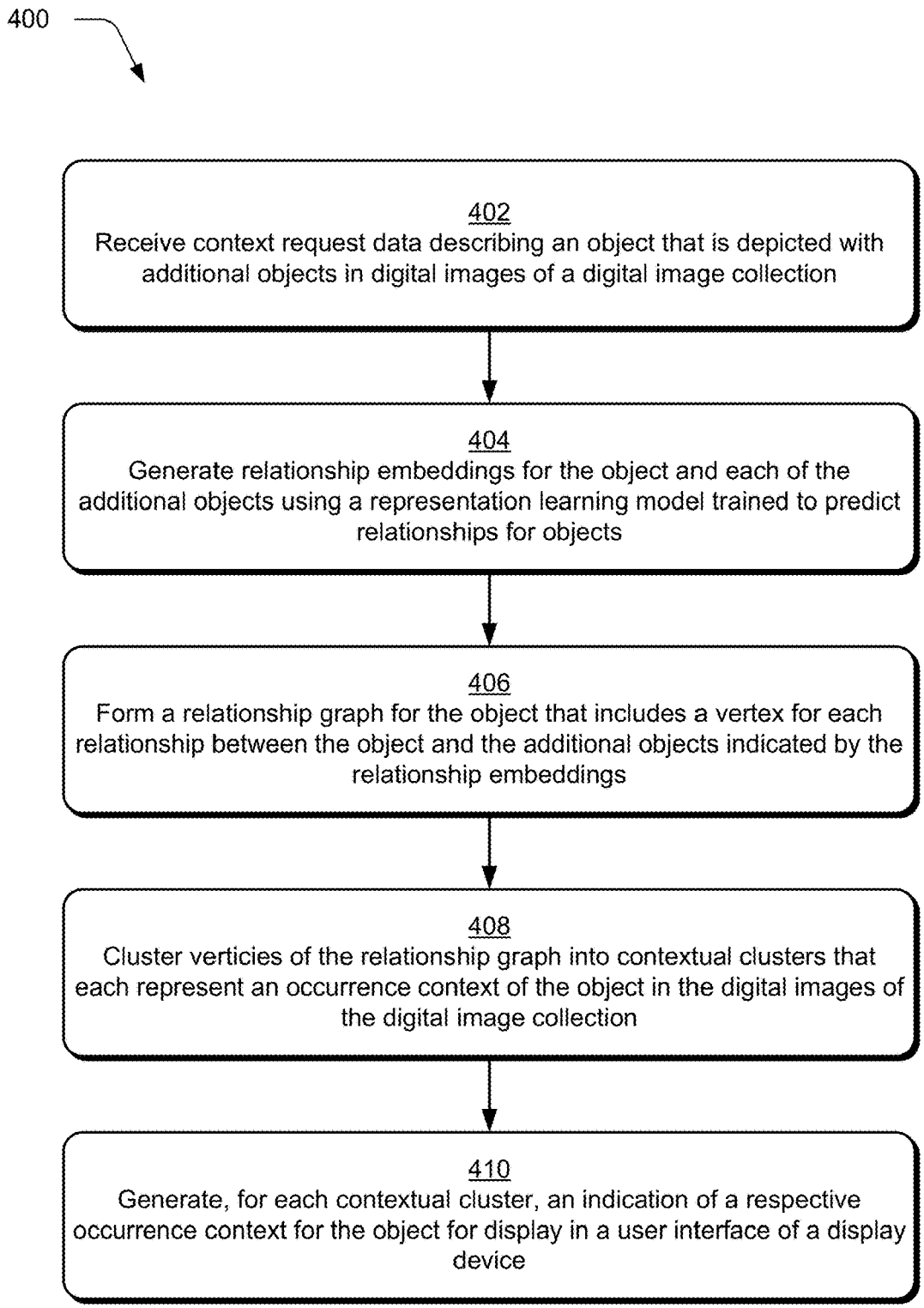
FIG. 4 is a flow diagram depicting a procedure in an example implementation in which context request data describing an object that is depicted with other objects in digital images of a digital image collection is received and indications of occurrence contexts for the object are generated for display in a user interface.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3. FIG. 4 is a flow diagram depicting a procedure 400 in an example implementation in which context request data describing an object that is depicted with other objects in digital images of a digital image collection is received and indications of occurrence contexts for the object are generated for display in a user interface. Context request data describing an object that is depicted with additional objects in digital images of a digital image collection is received (block 402). For example, the computing device 102 implements the context module 110 to receive the context request data.

Relationship embeddings for the object and each of the additional objects are generated using a representation learning model trained to predict relationships for objects (block 404). The computing device 102 implements the context module 110 to generate the relationship embeddings in one example. A relationship graph is formed for the object (block 406) that includes a vertex for each relationship between the object and the additional objects indicated by the relationship embeddings. For example, the context module 110 forms the relationship graph for the object.

Vertices of the relationship graph are clustered into contextual clusters that each represent an occurrence context for the object in the digital images of the digital image collection (block 408). The context module 110 clusters the vertices of the relationship graph into the contextual clusters in one example. For each contextual cluster, an indication of a respective occurrence context for the object is generated (block 410) for display in a user interface of a display device. In one example, the context module 110 generates the indication of the respective occurrence context for each contextual cluster.

Metric Examples

An example of generating occurrence contexts for objects in digital content collections is described with respect to a specific digital content collection. This dataset is the visual genome dataset which is a collection of approximately 108,000 digital images that are annotated with ground-truth scene graphs. The scene graph information is provided as a mapping from an imageID to a set of (subjectID, relationshipID, objectID) triplets. The dataset is pre-processed to remove objects that have fewer than four occurrences. Images are also removed from the dataset that include fewer than five or more than 35 triplets.

After the pre-processing, the dataset includes 83,751 digital images depicting 14,665 unique objects having 37,342 unique relationships. The 83,751 digital images included in the pre-processed dataset are split into two groups with 10 percent of the digital images withheld for demonstration purposes. The remaining 90 percent of the digital images are further split into two groups of 95 percent and 5 percent.

This 95 percent split is used to construct a global graph including one node for each object included in the digital images of the 95 percent split in the manner described previously with respect to the portion of the digital image collection 300. A translation-based representation learning model generates relationship embeddings for the objects included in this global graph and a relationship graph is formed that includes a vertex for each relationship between the objects depicted the digital images of the 95 percent split. The vertices of the relationship graph are clustered into contextual clusters using each of the previously described clustering methods.

The contextual clusters correspond to occurrence contexts for each of the objects depicted in the digital images of the 95 percent split. These learned representations are evaluated using the 5 percent split in a link prediction task. The contextual clusters are also evaluated based an average internal degree of nodes included in the contextual clusters, a number of edges per node that point outside of the contextual clusters, a fraction of total edge volume that points outside of the contextual clusters, average cosine similarity of Word2vec embeddings of all object pairs inside of the contextual clusters, and variance of the size of the contextual clusters.

TABLE 1

Contextual Cluster Metrics

| Method | Average Degree | Expansion | Conductance | Intra Cluster Similarity | Variance |
| --- | --- | --- | --- | --- | --- |
| Structure Unweighted | 39.10 | 30.37 | 0.47 | 0.336 | 101.48 |
| Structure Weighted | 42.19 | 43.72 | 0.66 | 0.356 | 25.07 |
| Semantic | 62.00 | 69.03 | 0.37 | 0.350 | 4.58 |
| Graphlet | 59.56 | 90.95 | 0.57 | 0.300 | 2.07 |
| Graphlet-Semantic | 67.12 | 58.86 | 0.33 | 0.342 | 5.35 |
| Weighted-Semantic | 38.47 | 41.14 | 0.66 | 0.364 | 24.54 |
| Weighted-Spanned | 33.48 | 68.14 | 0.61 | 0.335 | 26.34 |

Table 1 presents the contextual cluster metrics for each of the clustering methods. The learned embeddings associated with each of these clustering methods are further evaluated on the link prediction task. The link prediction task is a classification task and includes a classifier implemented as a two-layer neural network with rectified linear unit (ReLU) non-linearities. The classifier scores triplets of the learned embeddings based on a likelihood that the embeddings are valid edges in the corresponding graphs. The first layer of the classifier has dimensionality of 300*100 and the second layer has dimensionality of 100*1.

For the link prediction task, the (subject, relation, object) relationship triplets are denoted as {head(h), relation(r), tail(t)} triplets. Triplets included in the global graph are positive training samples for training the classifier. Negative training samples are generated by replacing one of the head(h), relation(r), tail(t) of a positive training sample with a randomly selected alternative and the resulting triplet is verified not to be a valid triplet. The classifier is trained on the same data used to construct the global graph (the digital images of the 95 percent split). Testing is performed using the 5 percent split.

Two alternative evaluations are performed using the classifier. The first alternative is referred to as OpenKE. For the OpenKE evaluations, the embeddings from the global graph are set not to be trainable, and the classifier is trained under this condition. The second alternative is referred to as End2End. For the End2End evaluations, the embeddings of all relationships for all included objects and the occurrence contexts for all the included objects are randomly initialized, and then the embeddings are trained end-to-end as part of the classifier training.

The test set that is evaluated over the 5 percent split includes positive training samples and negative training samples and the full set of samples of the test set are scored using the trained classifier. Metrics are considered which include Mean Rank (MR), Mean Reciprocal Rank (MRR), Recall@1, Recall@10, and area-under-the-curve of the classifier trained for link prediction. Mean Rank represents an average of rank of each positive test sample among its corresponding negatives. Mean Reciprocal Rank represents an average of the reciprocals of the ranks of the positive triplet samples. Recall@1 is a percentage of instances in which an original triplet ranked first, and Recall@10 is a percentage of instances in which the original triplet ranked within the top 10.

TABLE 2

Link Prediction Task Metrics

|  |  |  | AUC | MR | MRR | Recall@1 | Recall@10 |
|---|---|---|---|---|---|---|---|
| OpenKE |  | Global Graph | 0.936 | 620.000 | 0.083 | 0.034 | 0.178 |
|  | Occurrence | Structure Unweighted | 0.933 | 707.261 | 0.078 | 0.030 | 0.170 |
|  | Context | Structure Weighted | 0.939 | 645.480 | 0.091 | 0.038 | 0.193 |
|  |  | Semantic | 0.932 | 593.211 | 0.086 | 0.034 | 0.187 |
|  |  | Graphlet | 0.910 | 786.472 | 0.069 | 0.028 | 0.147 |
|  |  | Weighted-Spanned | 0.938 | 644.658 | 0.091 | 0.038 | 0.195 |
|  |  | Weighted-Semantic | 0.938 | 654.726 | 0.091 | 0.037 | 0.196 |
|  |  | Graphlet-Semantic | 0.929 | 600.228 | 0.088 | 0.035 | 0.194 |
| End2End |  | Global Graph | 0.933 | 839.322 | 0.049 | 0.017 | 0.106 |
|  | Occurrence | Structure Unweighted | 0.949 | 629.346 | 0.057 | 0.020 | 0.123 |
|  | Context | Structure Weighted | 0.946 | 655.862 | 0.056 | 0.020 | 0.121 |
|  |  | Semantic | 0.948 | 588.560 | 0.064 | 0.024 | 0.140 |
|  |  | Graphlet | 0.929 | 898.327 | 0.045 | 0.017 | 0.092 |
|  |  | Weighted-Spanned | 0.947 | 602.032 | 0.063 | 0.022 | 0.139 |
|  |  | Weighted-Semantic | 0.949 | 616.300 | 0.057 | 0.021 | 0.124 |
|  |  | Graphlet-Semantic | 0.946 | 579.327 | 0.067 | 0.025 | 0.148 |
| BiNE |  |  | 0.885 | 1150.070 | 0.015 | 0.006 | 0.021 |

Table 2 presents the link prediction task metrics for each model evaluated. Based on the data presented in Table 1 and Table 2, Weighted-Spanned, Weighted-Semantic, and Graphlet-Semantic clustering methods demonstrate superior performance among the models evaluated.

Figure 5A:
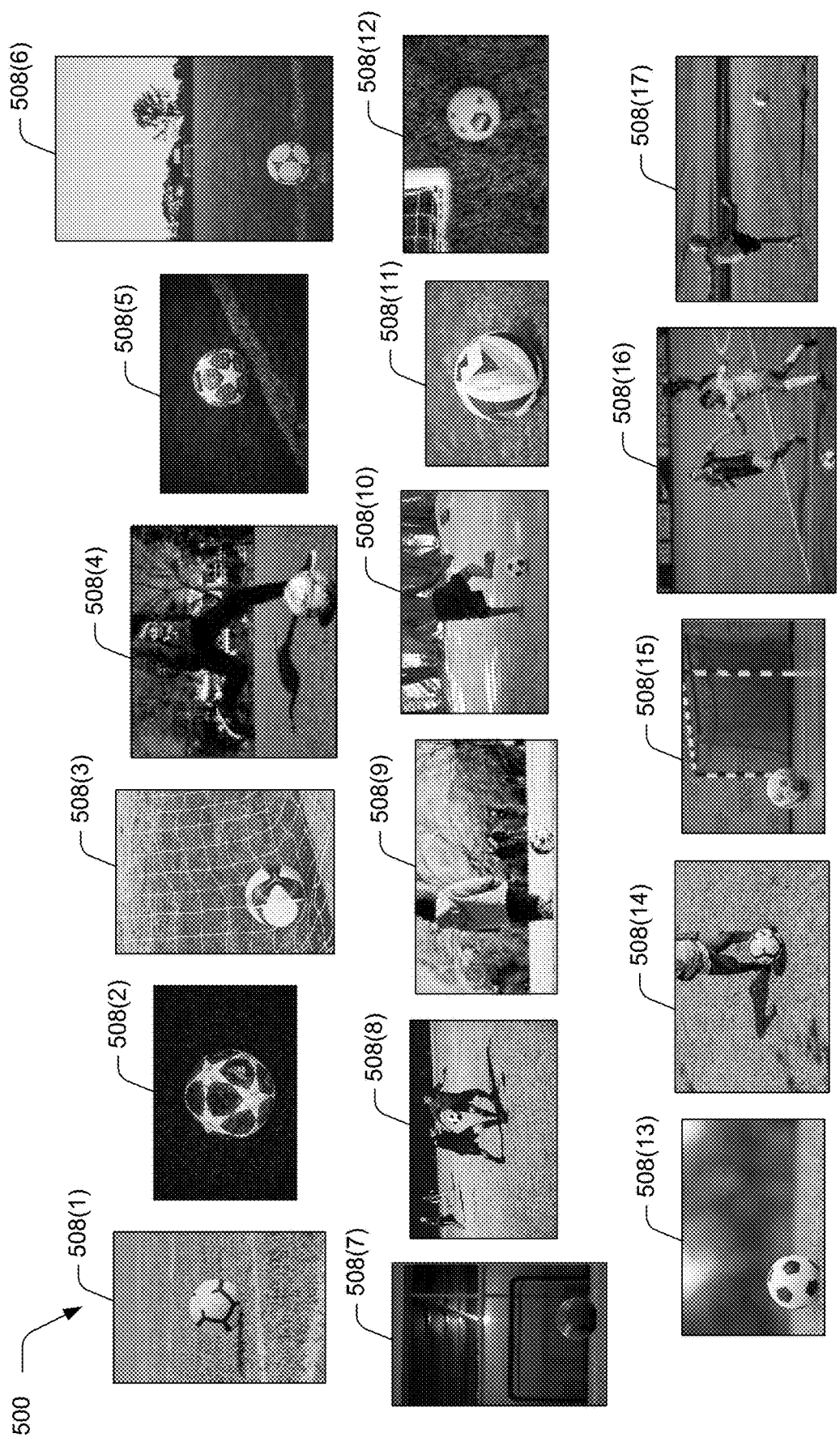
Figure 5B:
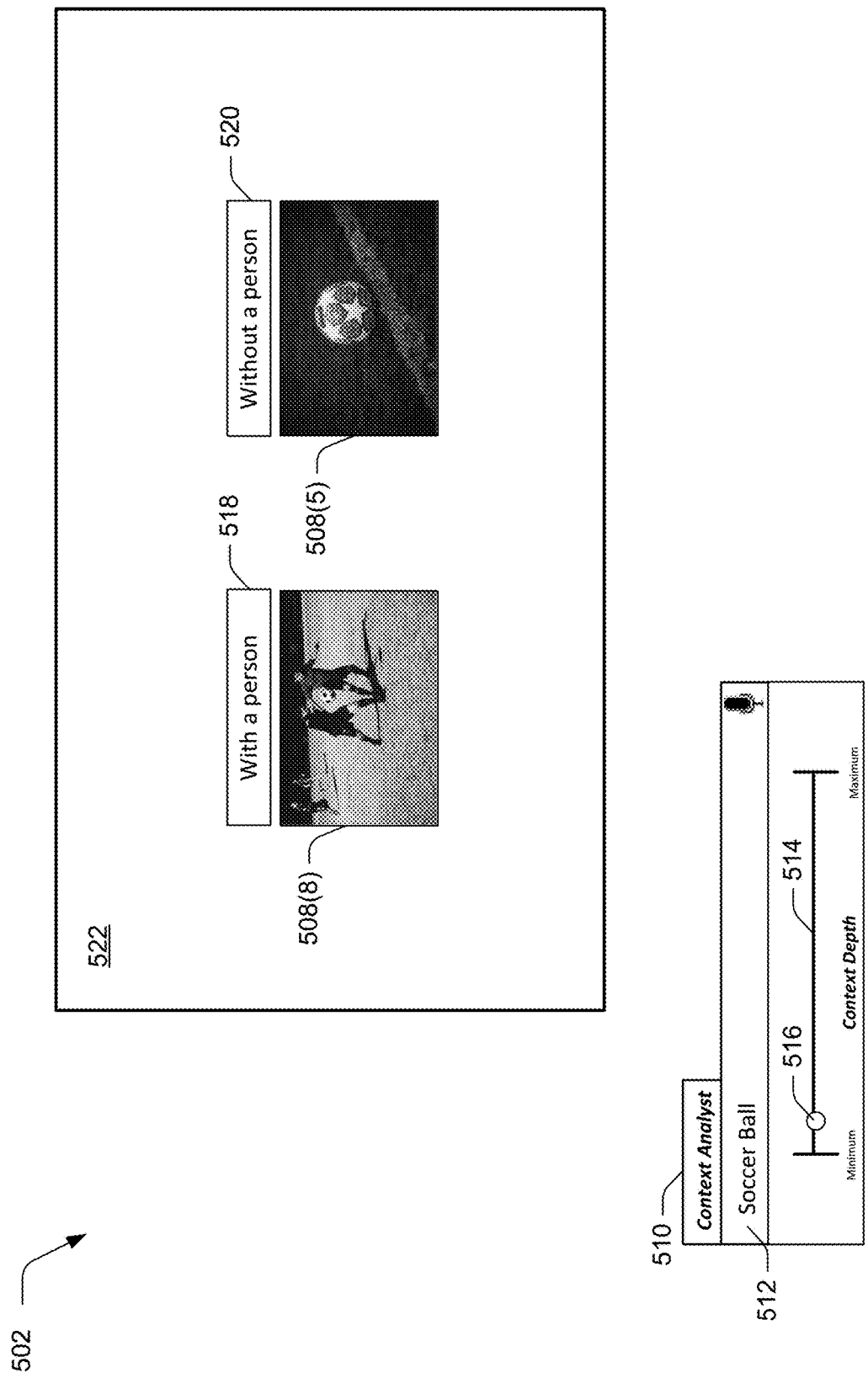
Figure 5C:
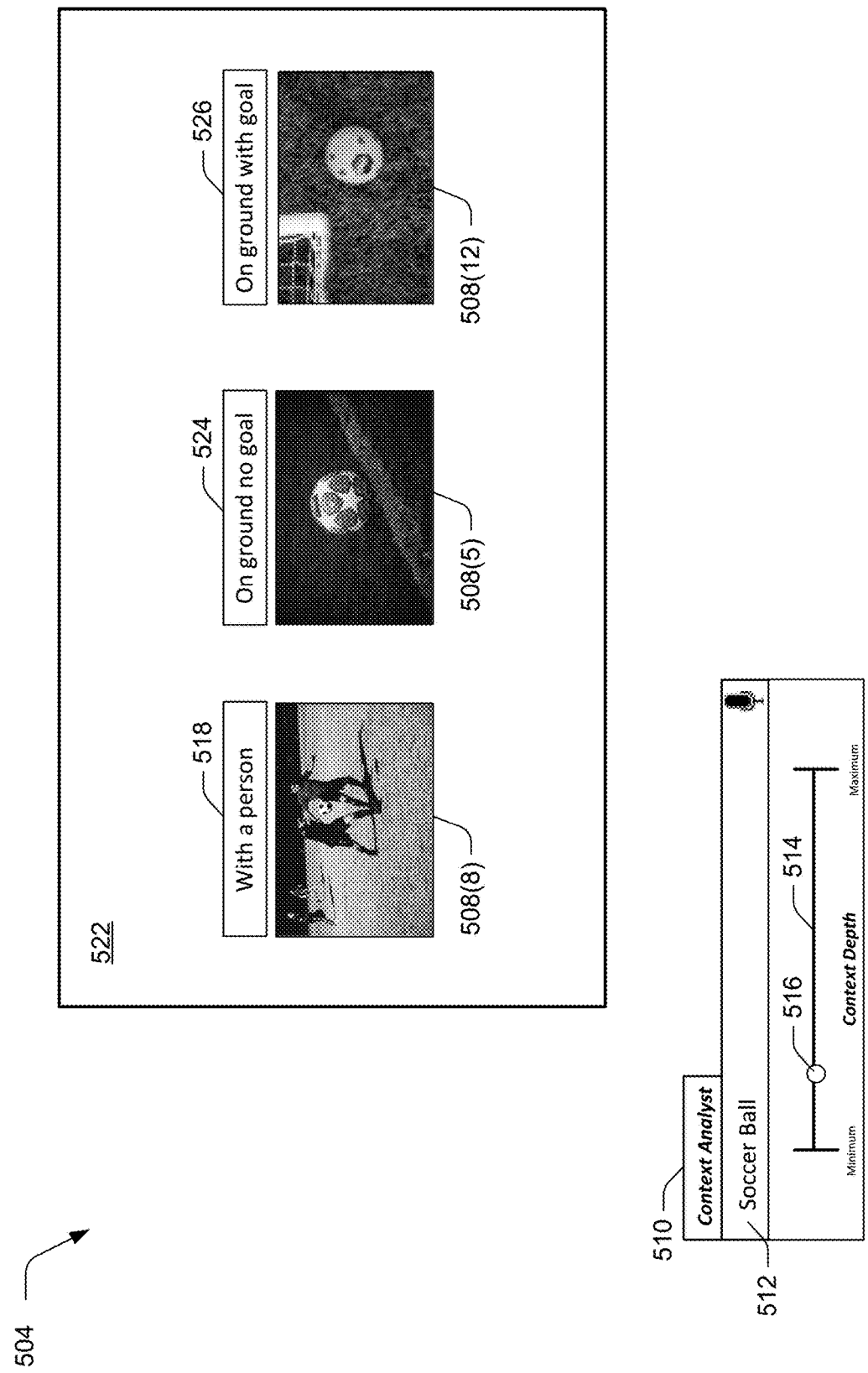

FIGS. 5A, 5B, 5C, and 5D illustrate an example of an object included in a digital content collection and a user interface for displaying occurrence contexts for the object in the digital content collection. FIG. 5A illustrates a digital image collection 500. FIG. 5B illustrates a representation 502 of a user interface displaying indications of two occurrence contexts for an object depicted in digital images of the digital image collection 500. FIG. 5C illustrates a representation 504 of the user interface displaying indication of three occurrence contexts for the object depicted in the digital images of the digital image collection 500. FIG. 5D illustrates a representation 506 of four occurrence contexts for the object depicted in the digital images of the digital image collection 500.

As shown in FIG. 5A, the digital image collection 500 includes digital images 508(1)-508(17). Digital image 508(1) depicts a soccer ball on a soccer field. Digital image 508(2) depicts a soccer ball on the ground. Digital image 508(3) depicts a soccer ball in a soccer goal net. Digital image 508(4) depicts a person about to kick a soccer ball on a soccer field. Digital image 508(5) depicts a soccer ball on a soccer field. Digital image 508(6) depicts a soccer ball on a soccer field with trees and a soccer goal. Digital image 508(7) depicts a soccer ball on the ground in front of a soccer goal. Digital image 508(8) depicts four people playing soccer with a soccer ball that is above the ground. Digital image 508(9) depicts a child standing next to a soccer ball with people in the background. Digital image 508(10) depicts a person with a soccer ball. Digital image 508(11) depicts a soccer ball on the ground. Digital image 508(12) depicts a soccer ball on the ground behind a soccer goal. Digital image 508(13) depicts a soccer ball on a soccer field. Digital image 508(14) depicts a child playing with a soccer ball. Digital image 508(15) depicts a soccer ball on the ground in front of a soccer goal. Digital image 508(16) depicts three people playing soccer with a soccer ball on a soccer field. Digital image 508(17) depicts a soccer ball that has been kicked by a person and is above a soccer field.

As shown in FIG. 5B, the representation 502 includes a user interface element 510 which is identified as a "Context Analyst." For example, a user interacts with an input device (e.g., a keyboard, a stylus, a microphone, and so forth) to indicate an object included in the digital images 508(1)-508(17) of the digital image collection 500 and the context module 110 receives the context request data 116 from the input device (e.g., via the network 104) that describes the object indicated by the user. In this example, the user has indicated a "soccer ball" object which is displayed in an input field 512 of the user interface element 510.

The user interface element 510 also includes a slider 514 and an adjustable indicator 516 for specifying a context depth to generate occurrence contexts for the soccer ball object in the digital image collection 500. In the illustrated example, the indicator 516 of the slider 514 is adjustable between a minimum and a maximum context depth. Although the indicator 516 is shown to be continuously adjustable, in some examples the indicator 516 is discretely adjustable such as between a fixed number of context depth values between the minimum and the maximum context depth. For example, increasing a context depth at which the context module 110 generates occurrence contexts for the soccer ball object causes the context module 110 to generate the occurrence contexts at a lower level of detail which increases a likelihood that the context module 110 will identify additional occurrence contexts for the soccer ball object in the digital image collection 500.

The user interacts with the input device to specify a first context depth by adjusting the indicator 516 and the context module 110 receives data describing the first context depth which is included in the context request data 116 in one example. The context module 110 processes the digital content data 112 which describes the digital image collection 500 and generates occurrence contexts 518, 520 which are displayed in a display portion 522. Indications 508(8) and 508(5) of the respective occurrence contexts 518 and 520 are also displayed in the display portion 522.

As shown, occurrence context 518 is "with a person" and indication 508(8) is a digital image depicting people playing soccer with a soccer ball. Occurrence context 520 is "without a person" and indication 508(5) is a digital image depicting a soccer ball on a soccer field. As illustrated in FIG. 5A, each of the digital images 508(1)-508(17) includes a scene graph that belongs in one of the two occurrence contexts 518, 520 for the soccer ball object in the digital image collection 500. For example, the soccer ball object is depicted in the occurrence context 518 in digital images 508(4), 508(8), 508(9), 508(10), 508(14), 508(16), and 508(17). The soccer ball object is depicted in the occurrence context 520 in digital images 508(1), 508(2), 508(3), 508(5), 508(6), 508(7), 508(11), 508(12), 508(13), and 508(15).

Since the occurrence contexts 518, 520 collectively represent every digital image of the digital image collection 500, the occurrence contexts 518, 520 summarize how the soccer ball is depicted with other objects in the digital images 508(1)-508(17). Thus, the occurrence contexts 518, 520 are useable to infer additional information about the digital image collection 500 without having any other information about the digital images 508(1)-508(17). This functionality is particularly useful for summarizing large collections of digital images in which a review of each of the digital images included in the large collections would be impossible or impractical.

In the representation 504 illustrated in FIG. 5C, the user has adjusted the indicator 516 to specify a second context depth for generating occurrence contexts of the soccer ball object in the digital image collection 500. As shown, the second context depth is greater than the first context depth. For example, increasing the context depth increases a number of contextual clusters that each represent an occurrence context for the soccer ball object in the digital image collection 500. In another example, adjusting the context depth changes a clustering method used to generate occurrence contexts. In this example, the context module 110 uses a first one of the Structure Unweighted method, the Structure Weighted method, the Semantic method, the Graphlet method, the Graphlet-Semantic method, the Weighted-Semantic method, and the Weighted-Spanned method to generate occurrence contexts at the first context depth and the context module 110 uses a second one of the Structure Unweighted method, the Structure Weighted method, the Semantic method, the Graphlet method, the Graphlet-Semantic method, the Weighted-Semantic method, and the Weighted-Spanned method to generate occurrence contexts at the second context depth.

The context module 110 receives data describing the second context depth which is included in the context request data 116 and the context module 110 processes the digital content data 112 and generates occurrence contexts 518, 526, 526 which are displayed in the display portion 522. Indications 508(8), 508(5), and 508(12) of the respective occurrence contexts 518, 524, and 526 are also displayed in the display portion 522. Occurrence context 518 is "with a person" and the indication 508(8) is a digital image depicting people playing soccer with a soccer ball. Occurrence context 524 is "on ground no goal" and the indication 508(5) is a digital image depicting a soccer ball on a soccer field. Occurrence context 526 is "on ground with goal" and the indication 508(12) is a digital image depicting a soccer ball on a soccer field near a soccer goal.

As illustrated in FIG. 5A, each of the digital images 508(1)-508(17) includes a scene graph that belongs in one of the three occurrence contexts 518, 524, 526 for the soccer ball object in the digital image collection 500. For example, the soccer ball object is depicted in the occurrence context 518 in digital images 508(4), 508(8), 508(9), 508(10), 508(14), 508(16), and 508(17). The soccer ball object is depicted in the occurrence context 524 in digital images 508(1), 508(2), 508(5), 508(11), and 508(13). The soccer ball object is depicted in the occurrence context 526 in digital images 508(3), 508(6), 508(7), 508(12), and 508(15).

Since the occurrence contexts 518, 524, 526 collectively represent every digital image of the digital image collection 500, the occurrence contexts 518, 524, 526 summarize how the soccer ball is depicted with other objects in the digital images 508(1)-508(17) which is a different summary than illustrated in the representation 502. Thus, the occurrence contexts 518, 524, 526 are useable to infer additional information about the digital image collection 500 without having any other information about the digital images 508(1)-508(17). By adjusting the context depth used to generate occurrence contexts in this manner, it is possible to understand how an object is depicted with other objects in a large collection of digital images at different levels of context.

In the representation 506 illustrated in FIG. 5D, the user has adjusted the indicator 516 to specify a third context depth for generating occurrence contexts of the soccer ball object in the digital image collection 500. As shown, the third context depth is greater than the second context depth. In one example, increasing the context depth increases a number of contextual clusters that each represent an occurrence context for the soccer ball object in the digital image collection 500. In another example, adjusting the context depth changes a clustering method used to generate occurrence contexts. For example, the context module 110 uses a first one of the Structure Unweighted method, the Structure Weighted method, the Semantic method, the Graphlet method, the Graphlet-Semantic method, the Weighted-Semantic method, and the Weighted-Spanned method to generate occurrence contexts at the first context depth and the context module 110 uses a second one of the Structure Unweighted method, the Structure Weighted method, the Semantic method, the Graphlet method, the Graphlet-Semantic method, the Weighted-Semantic method, and the Weighted-Spanned method to generate occurrence contexts at the second context depth. In this example, the context module 110 uses a third one of the Structure Unweighted method, the Structure Weighted method, the Semantic method, the Graphlet method, the Graphlet-Semantic method, the Weighted-Semantic method, and the Weighted-Spanned method to generate occurrence contexts at the third context depth.

The context module 110 receives data describing the third context depth which is included in the context request data 116 and the context module 110 processes the digital content data 112 and generates occurrence contexts 524, 526, 528, 530 which are displayed in the display portion 522. Indications 508(5), 508(12), 508(8), and 508(17) of the respective occurrence contexts 524, 526, 528, and 530 are also displayed in the display portion 522. Occurrence context 524 is "on ground no goal" and the indication 508(5) is a digital image depicting a soccer ball on a soccer field. Occurrence context 526 is "on ground with goal" and the indication 508(12) is a digital image depicting a soccer ball on a soccer field near a soccer goal. Occurrence context 528 is "with people" and the indication 508(8) is a digital image depicting people playing soccer with a soccer ball. Occurrence context 530 is "with single person" and the indication 508(17) is a digital image depicting a single person that has kicked a soccer ball.

As illustrated in FIG. 5A, each of the digital images 508(1)-508(17) includes a scene graph that belongs in one of the four occurrence contexts 524, 526, 528, 530 for the soccer ball object in the digital image collection 500. The soccer ball object is depicted in the occurrence context 524 in digital images 508(1), 508(2), 508(5), 508(11), and 508(13). As shown, the soccer ball object is depicted in the occurrence context 526 in digital images 508(3), 508(6), 508(7), 508(12), and 508(15). The soccer ball object is depicted in occurrence context 528 in digital images 508(8), 508(9), and 508(16) and the soccer ball object is depicted in occurrence context 530 in digital images 508(10), 508(14), and 508(17). Because the occurrence contexts 524, 526, 528, 530 collectively represent every digital image of the digital image collection 500, the occurrence contexts 524, 526, 528, 530 summarize how the soccer ball is depicted with other objects in the digital images 508(1)-508(17) which is a different summary those illustrated in the representation 502 and the representation 504.

Example System and Device

Figure 6:
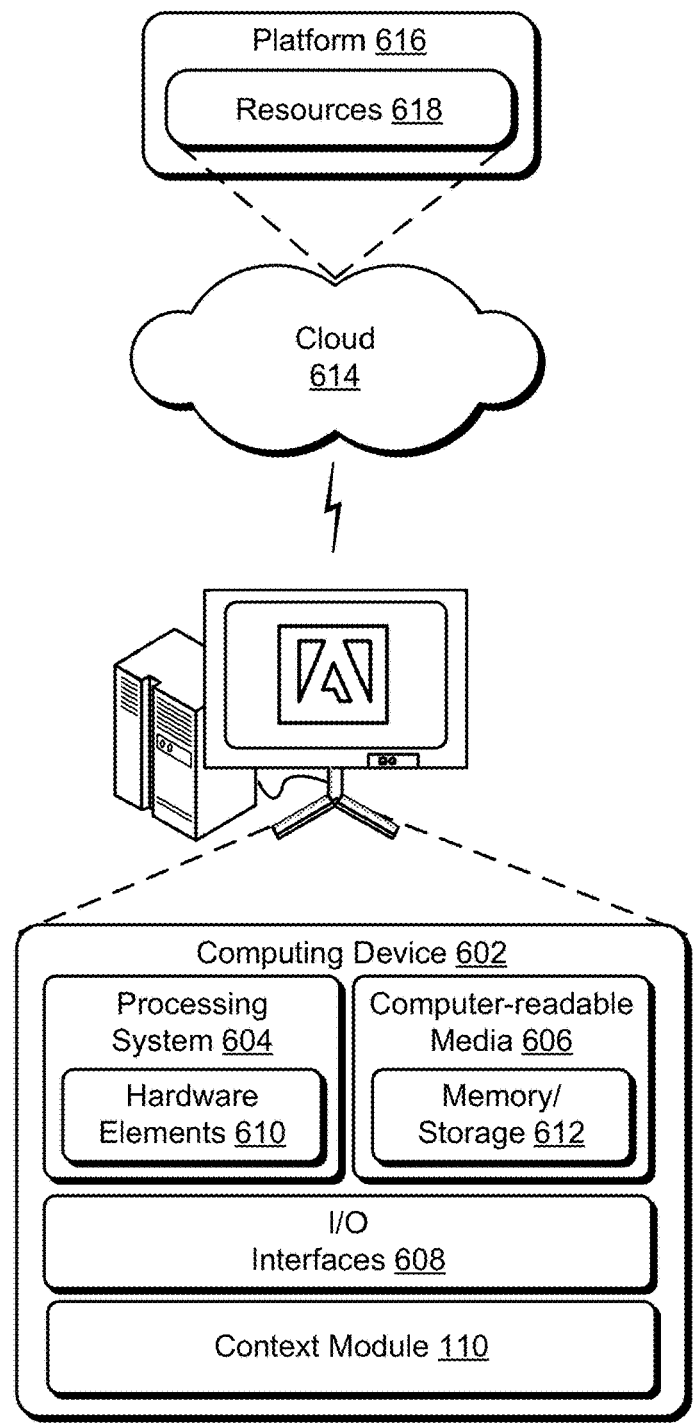
FIG. 6 illustrates an example system that includes an example computing device that is representative of one or more computing systems and/or devices for implementing the various techniques described herein.

FIG. 6 illustrates an example system 600 that includes an example computing device that is representative of one or more computing systems and/or devices that are usable to implement the various techniques described herein. This is illustrated through inclusion of the context module 110. The computing device 602 includes, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that are be configured as processors, functional blocks, and so forth. This includes example implementations in hardware as an application specific integrated circuit or other logic device formed using one or more semiconductors. The hardware elements 610 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 606 is illustrated as including memory/storage 612. The memory/storage 612 represents memory/storage capacity associated with one or more computer-readable media. In one example, the memory/storage component 612 includes volatile media (such as random access memory (RAM)) and/or nonvolatile media (such as read only memory (ROM), Flash memory, optical disks, magnetic disks, and so forth). In another example, the memory/storage component 612 includes fixed media (e.g., RAM, ROM, a fixed hard drive, and so on) as well as removable media (e.g., Flash memory, a removable hard drive, an optical disc, and so forth). The computer-readable media 606 is configurable in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that that is accessible to the computing device 602. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 602, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 610. For example, the computing device 602 is configured to implement particular instructions and/or functions corresponding to the software and/or hardware modules. Accordingly, implementation of a module that is executable by the computing device 602 as software is achieved at least partially in hardware, e.g., through use of computer-readable storage media and/or hardware elements 610 of the processing system 604. The instructions and/or functions are executable/operable by one or more articles of manufacture (for example, one or more computing devices 602 and/or processing systems 604) to implement techniques, modules, and examples described herein.

The techniques described herein are supportable by various configurations of the computing device 602 and are not limited to the specific examples of the techniques described herein. This functionality is also implementable entirely or partially through use of a distributed system, such as over a "cloud" 614 as described below.

The cloud 614 includes and/or is representative of a platform 616 for resources 618. The platform 616 abstracts underlying functionality of hardware (e.g., servers) and software resources of the cloud 614. For example, the resources 618 include applications and/or data that are utilized while computer processing is executed on servers that are remote from the computing device 602. In some examples, the resources 618 also include services provided over the Internet and/or through a subscriber network, such as a cellular or Wi-Fi network.

The platform 616 abstracts the resources 618 and functions to connect the computing device 602 with other computing devices. In some examples, the platform 616 also serves to abstract scaling of resources to provide a corresponding level of scale to encountered demand for the resources that are implemented via the platform. Accordingly, in an interconnected device embodiment, implementation of functionality described herein is distributable throughout the system 600. For example, the functionality is implementable in part on the computing device 602 as well as via the platform 616 that abstracts the functionality of the cloud 614.

CONCLUSION

Although implementations of generating occurrence contexts for objects in digital content collections have been described in language specific to structural features and/or methods, it is to be understood that the appended claims are not necessarily limited to the specific features or methods described. Rather, the specific features and methods are disclosed as example implementations of generating occurrence contexts for objects in digital content collections, and other equivalent features and methods are intended to be within the scope of the appended claims. Further, various different examples are described and it is to be appreciated that each described example is implementable independently or in connection with one or more other described examples.

What is claimed is:

1. In a digital medium environment to determine contexts in which objects appear in a digital image collection, a method implemented by a computing device, the method comprising:
   receiving, by a representation learning module, context request data describing an object that is depicted with additional objects in digital images of the digital image collection;
   generating, by the representation learning module, relationship embeddings for the object and each of the additional objects using a representation learning model trained to predict relationships for objects;
   forming, by a graph module, a relationship graph for the object that includes a vertex for each relationship between the object and the additional objects indicated by the relationship embeddings;
   clustering, by a cluster module, vertices of the relationship graph into contextual clusters that each represent an occurrence context of the object in the digital images of the digital image collection; and
   generating, by the cluster module and for each contextual cluster, an indication of a respective occurrence context for the object for display in a user interface of a display device.

2. The method as described in claim 1, wherein the representation learning model includes a translation-based model.

3. The method as described in claim 2, wherein the representation learning model is trained to predict the relationships for the objects using training data describing relationships of other objects depicted together in additional digital images of the digital image collection.

4. The method as described in claim 1, further comprising forming a modified relationship graph for the object using the contextual clusters and contextual embeddings for the object generated by the representation learning model.

5. The method as described in claim 1, further comprising:
   generating external data describing the object and the additional objects; and
   clustering the vertices of the relationship graph into the contextual clusters based at least partially on the external data.

6. The method as described in claim 4, wherein the external data is semantic data describing the object and the additional objects generated using a machine learning model trained to predict word associations using training data describing a corpus of text.

7. The method as described in claim 4, wherein the external data is color data describing colors of the object and the additional objects as depicted in the digital images.

8. The method as described in claim 4, wherein the external data is graphlet data describing induced subgraphs of the relationship graph.

9. The method as described in claim 4, wherein the external data is weighted data describing a number of occurrences of each relationship between the object and the additional objects indicated by the relationship embeddings.

10. The method as described in claim 1, wherein the relationship graph is a heterogenous graph.

11. In a digital medium environment to determine contexts in which objects appear in a digital image collection, a system comprising:
   a representation learning module implemented at least partially in hardware of a computing device to:
      receive context request data describing an object that is depicted with additional objects in digital images of the digital image collection; and
      generate relationship embeddings for the object and each of the additional objects using a representation learning model trained to predict relationships for objects;
   a graph module implemented at last partially in the hardware of the computing device to form a relationship graph for the object that includes a vertex for each relationship between the object and the additional objects indicated by the relationships embeddings; and
   a cluster module implemented at least partially in the hardware of the computing device to:
      cluster vertices of the relationship graph into contextual clusters that each represent an occurrence context of the object in the digital images of the digital image collection; and
      generate, for each contextual cluster, an indication of a respective occurrence context for the object for display in a user interface of a display device.

12. The system as described in claim 11, wherein the cluster module is further implemented to:
   generate semantic data describing the object and the additional objects using a machine learning model trained to predict word associations using training data describing a corps of text; and
   cluster the vertices of the relationship graph into the contextual clusters based at least partially on the semantic data.

13. The system as described in claim 11, wherein the cluster module is further implemented to:
   generate weighted data describing a number of occurrences of each relationship between the object and the additional object indicate by the relationship embedding s; and
   cluster the vertices of the relationship graph into the contextual clusters based at least partially on the weighted data.

14. The system as described in claim 11, wherein the cluster module is further implemented to:
   generate graphlet data describing induced subgraphs of the relationship graph; and
   cluster the vertices of the relationship graph into the contextual clusters based at least partially on the graphlet data.

15. The system as described in claim 11, wherein the representation learning model is trained to predict the relationships for the objects using training data describing relationships of other objects depicted together in additional digital images of the digital image collection and the representation learning model includes a translation-based model.

16. One or more computer-readable storage media comprising instructions stored thereon that, responsive to execution by a computing device, causes the computing device to perform operations including:
   receiving context request data describing an object that is depicted with additional objects in digital images of a digital image collection;
   forming a global graph for the digital image collection having one node for the object and one node for each of the additional objects;
   generate relationship embeddings for the object and each of the additional objects using the global graph and a representation learning module trained to predict relationships for objects;
   forming a relationship graph for the object that includes a vertex for each relationship between the object and the additional objects indicated by the relationship embeddings;
   clustering vertices of the relationship graph into contextual clusters that each represent an occurrence context of the object in the digital images of the image collection; and
   generating, for each contextual cluster, an indication of a respective occurrence context for the object for display in a user interface of a display device.

17. The one or more computer-readable storage media as described in claim 16, wherein the representation learning model is trained to predict the relationships for the objects using training data describing relationships of other objects depicted together in additional digital images of the digital image collection and the representation learning model includes a translation-based model.

18. The one or more computer-readable storage media as described in claim 16, wherein the operations further include:
   generating color data describing colors of the object and the additional objects as depicted in the digital images; and
   clustering the vertices of the relationship graph into the contextual clusters based at least partially on the color data.

19. The one or more computer-readable storage media as described in claim 16, wherein the operations further include:
   generating semantic data describing the object and the additional objects using a machine learning model trained to predict word associations using training data describing a corps of text; and
   clustering the vertices of the relationship graph into the contextual clusters based at least partially on the semantic data.

20. The one or more computer-readable storage media as described in claim 16, wherein the operations further include:
   generating graphlet data describing induced subgraphs of the relationship graph; and
   clustering the vertices of the relationship graph into the contextual clusters based at least partially on the graphlet data.

* * * * *

UNITED STATES PATENT AND TRADEMARK OFFICE
CERTIFICATE OF CORRECTION

PATENT NO. : 11,836,187 B2
APPLICATION NO. : 17/079945
DATED : December 5, 2023
INVENTOR(S) : Manoj Kilaru et al.

It is certified that error appears in the above-identified patent and that said Letters Patent is hereby corrected as shown below:

On the Title Page

Item (57) in the Abstract, Line 1, delete "implementations of".

In the Claims

Column 22, Line 8, delete "In a digital medium environment to determine contexts in which objects appear in a digital image collection, a" insert -- "A" --, therefor.
Column 22, Line 15, after "in digital images of", delete "the" insert -- a --, therefor.
Column 22, Line 18, after "relationship embeddings for", delete "the" insert -- an --, therefor.
Column 22, Line 51, after "as described in claim", delete "4" insert -- 5 --, therefor.
Column 22, Line 56, after "as described in claim", delete "4" insert -- 5 --, therefor.
Column 22, Line 59, after "as described in claim", delete "4" insert -- 5 --, therefor.
Column 22, Line 62, after "as described in claim", delete "4" insert -- 5 --, therefor.
Column 23, Line 1, delete "In a digital medium environment to determine contexts in which objects appear in a digital image collection, a" insert -- "A" --, therefor.
Column 23, Line 8, delete "the" insert -- "a" --, therefor.
Column 23, Line 13, delete "last" insert -- "least" --, therefor.
Column 23, Line 33, after "describing a", delete "corps" insert -- corpus --, therefor.
Column 23, Line 59, after "one or more", insert -- non-transitory --, therefor.
Column 23, Line 59, after "storage media", delete "comprising" insert -- storing --, therefor.
Column 23, Line 60, after "instructions stored", delete "thereon", therefor.
Column 24, Line 2, after "perform operations", delete "including" insert -- comprising --, therefor.
Column 24, Line 12, after "representation learning", delete "module" insert -- model --, therefor.
Column 24, Line 25, after "one or more", insert -- non-transitory --, therefor.
Column 24, Line 33, after "one or more", insert -- non-transitory --, therefor.
Column 24, Line 42, after "one or more", insert -- non-transitory --, therefor.
Column 24, Line 48, after "describing a", delete "corps" insert -- corpus --, therefor.
Column 24, Line 52, after "one or more", insert -- non-transitory --, therefor.

Signed and Sealed this
Twenty-first Day of May, 2024

Katherine Kelly Vidal
*Director of the United States Patent and Trademark Office*